US012673001B2

(12) United States Patent
Marcel

(10) Patent No.: US 12,673,001 B2
(45) Date of Patent: Jul. 7, 2026

(54) METHODS, SYSTEMS, APPARATUSES, AND DEVICES FOR PROVIDING A BALANCE TO OBJECTS

(71) Applicant: Jesse Antoine Marcel, Veradale, WA (US)

(72) Inventor: Jesse Antoine Marcel, Veradale, WA (US)

( * ) Notice: Subject to any disclaimer, the term of this patent is extended or adjusted under 35 U.S.C. 154(b) by 826 days.

(21) Appl. No.: 17/974,610

(22) Filed: Oct. 27, 2022

(65) Prior Publication Data

US 2024/0142233 A1 May 2, 2024

Related U.S. Application Data

(60) Provisional application No. 63/273,511, filed on Oct. 29, 2021.

(51) Int. Cl.
*A61H 3/00* (2006.01)
*G01C 19/30* (2006.01)

(52) U.S. Cl.
CPC ......... *A61H 3/00* (2013.01); *A61H 2003/007* (2013.01); *A61H 2201/1215* (2013.01);
(Continued)

(58) Field of Classification Search
CPC ....... B25J 9/0006; A61H 1/0237–0296; A61H 2201/1215; A61H 2201/165;
(Continued)

(56) References Cited

U.S. PATENT DOCUMENTS

| | | | | |
|---|---|---|---|---|
| 4,340,216 A | * | 7/1982 | Murphy | F16C 19/507 |
| | | | | 212/337 |
| 2014/0180184 A1 | * | 6/2014 | Duguid | A61H 3/00 |
| | | | | 601/87 |

(Continued)

FOREIGN PATENT DOCUMENTS

| | | | | | |
|---|---|---|---|---|---|
| WO | WO-2011074299 A1 | * | 6/2011 | | A61H 3/00 |
| WO | WO-2020108517 A1 | * | 6/2020 | | B25J 9/0006 |

OTHER PUBLICATIONS

Translation of WO 2011/074299. Accessed from PE2E-Search on Sep. 5, 2025. (Year: 2011).*

*Primary Examiner* — Paige Kathleen Bugg
(74) *Attorney, Agent, or Firm* — Dhiraj Jindal; PATENT YOGI LLC

(57) ABSTRACT

An apparatus for providing a balance to objects attached to the apparatus. The apparatus comprises an annular body, drive assemblies, two hoops, and a harness. The annular body is placed around an object. Each drive assembly comprises a primary sheave radially and rotatably disposed on the annular body, a first secondary sheave rotatably disposed on the annular body above the primary sheave, a second secondary sheave rotatably disposed on the annular body below the primary sheave, and a motor for rotating the primary sheave. The two hoops comprise a first hoop rotatably supported between the primary sheave and the first secondary sheave and a second hoop rotatably supported between the primary sheave and the second secondary sheave. Rotating the primary sheave rotates the first hoop in a first direction and the second hoop in a second direction for generating the balance. The harness attaches the apparatus to the object.

20 Claims, 30 Drawing Sheets

(52) U.S. Cl.
CPC ................ *A61H 2201/1652* (2013.01); *A61H 2201/5007* (2013.01); *A61H 2201/5058* (2013.01); *A61H 2203/0406* (2013.01); *G01C 19/30* (2013.01)

(58) Field of Classification Search
CPC .... A61H 2201/1652; A61H 2201/5007; A61H 2201/5058; A61H 2203/0406
See application file for complete search history.

(56) References Cited

U.S. PATENT DOCUMENTS

| | | | |
|---|---|---|---|
| 2017/0007491 A1* | 1/2017 | Crombie | A63B 21/4033 |
| 2018/0125692 A1* | 5/2018 | Takenaka | A61F 5/0102 |
| 2022/0040025 A1* | 2/2022 | Yoshimi | B25J 9/1615 |
| 2022/0096295 A1* | 3/2022 | Ang | A61H 3/008 |
| 2025/0161624 A1* | 5/2025 | Brodsky | A63B 22/02 |

* cited by examiner

2900

2912

- AT LEAST ONE REQUEST
- AT LEAST ONE MANEUVER
  INDICATION

METHODS, SYSTEMS, APPARATUSES, AND DEVICES FOR PROVIDING A BALANCE TO OBJECTS

CROSS-REFERENCE TO RELATED APPLICATION

This application claims the benefit of U.S. Provisional Patent Application No. 63/273,511, titled "CYBERNETIC BALANCE ENHANCING METHOD AND APPARATUS", filed on 29 Oct. 2021, which is incorporated by reference herein in its entirety.

FIELD OF THE INVENTION

Generally, the present disclosure relates to the field of supports. More specifically, the present disclosure relates to methods, systems, apparatuses, and devices for providing a balance to objects.

BACKGROUND OF THE INVENTION

There are many known devices to assist athletes' ability to balance and locomote. Most of these are in the form of athletic wear, for example running shoes with spikes, or a tight ropewalker who uses a long pole to maintain balance. While aiding in locomotion and assisting with balance, they are limited to very specific instances and do little if the user was to stumble or fall. Further, current devices and apparatuses are designed to assist a user's ability to balance. As a result, different devices and apparatuses are needed which provide additional balance to the user and/or objects to proactively prevent them from falling, tumbling, rolling, etc. Further, current devices and apparatuses are designed to prevent the user and/or objects from falling, tumbling, rolling, etc by assisting their ability to balance. As a result, different devices and apparatuses are needed that predict the falling, tumbling, rolling, etc., of the user and/or objects beforehand and prevent it.

Therefore, there is a need for improved methods, systems, apparatuses, and devices for providing a balance to objects that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for providing a balance to objects attached to the apparatus, in accordance with some embodiments. Accordingly, the apparatus may include an annular body, a plurality of drive assemblies, two hoops, and a harness. Further, the annular body may include a central cavity about a central axis of the annular body. Further, the annular body may be configured for receiving an object in the central cavity for placing the annular body around the object. Further, the plurality of drive assemblies may be mounted to the annular body. Further, each of the plurality of drive assemblies may include a motor, a primary sheave, and two secondary sheaves. Further, the primary sheave may be radially and rotatably disposed on the annular body, a first secondary sheave of the two secondary sheaves may be rotatably disposed on a top side of the annular body above the primary sheave, and a second secondary sheave of the two secondary sheaves may be rotatably disposed on a bottom side opposite to the top side of the annular body below the primary sheave based on the mounting of each of the plurality of drive assemblies on the annular body. Further, the primary sheave and the two secondary sheaves may be coplanar. Further, the motor may be mechanically coupled with the primary sheave. Further, the motor may be configured for rotating the primary sheave about a sheave axis perpendicular to the central axis in at least one direction with at least one speed. Further, the two hoops may include a first hoop and a second hoop. Further, the first hoop may be coaxially disposed on the top side and rotatably supported between a primary groove surface of the primary sheave and a first secondary groove surface of the first secondary sheave. Further, the second hoop may be coaxially disposed on the bottom side and rotatably supported between the primary groove surface and a second secondary groove surface of the second secondary sheave. Further, the rotating of the primary sheave rotates the first hoop in a first direction with at least one hoop speed about the central axis and the second hoop in a second direction opposite to the first direction with the at least one hoop speed about the central axis for generating the balance. Further, the harness may be configured for attaching the apparatus to the object after the receiving of the object in the central cavity. Further, the attaching of the apparatus to the object provides the balance to the object based on the generating.

Further disclosed herein is an apparatus for providing a balance to objects attached to the apparatus, in accordance with some embodiments. Accordingly, the apparatus may include an annular body, a plurality of drive assemblies, two hoops, a harness, at least one motion sensor, and a processing device. Further, the annular body may include a central cavity about a central axis of the annular body. Further, the annular body may be configured for receiving an object in the central cavity for placing the annular body around the object. Further, the plurality of drive assemblies may be mounted to the annular body. Further, each of the plurality of drive assemblies may include a motor, a primary sheave, and two secondary sheaves. Further, the primary sheave may be radially and rotatably disposed on the annular body, a first secondary sheave of the two secondary sheaves may be rotatably disposed on a top side of the annular body above the primary sheave, and a second secondary sheave of the two secondary sheaves may be rotatably disposed on a bottom side opposite to the top side of the annular body below the primary sheave based on the mounting of each of the plurality of drive assemblies on the annular body. Further, the primary sheave and the two secondary sheaves may be coplanar. Further, the motor may be mechanically coupled with the primary sheave. Further, the motor may be configured for rotating the primary sheave about a sheave axis perpendicular to the central axis in at least one direction with at least one speed. Further, the two hoops may include a first hoop and a second hoop. Further, the first hoop may be coaxially disposed on the top side and rotatably supported between a primary groove surface of the primary sheave and a first secondary groove surface of the first secondary sheave. Further, the second hoop may be coaxially disposed on the bottom side and rotatably supported between the primary groove surface and a second secondary groove surface of the second secondary sheave. Further, the rotating of the primary sheave rotates the first hoop in a first direction with at least one hoop speed about the central axis and the second hoop in a second direction opposite to the first direction with the at least one hoop speed about the central axis for generating the balance. Further, the harness may be configured for attaching the apparatus to the object after the receiving of the object in the central cavity. Further, the attaching of the apparatus to the object provides the balance to the object based on the generating. Further, the balance may be associated with a balance level corresponding to each of the at least one hoop speed of the two hoops. Further, the balance level of the balance prevents an instance of a disbalance associated with a disbalance level smaller than the balance level in the object. Further, the at least one motion sensor may be configured for generating at least one motion data based on detecting a movement associated with the object. Further, the processing device may be communicatively coupled with the at least one motion sensor. Further, the processing device may be configured for analyzing the at least one motion data. Further, the processing device may be configured for determining the instance of the disbalance in the object based on the analyzing. Further, the processing device may be configured for generating a command for the motor of each of the plurality of drive assemblies based on the determining. Further, the motor of each of the plurality of drive assemblies may be communicatively coupled with the processing device. Further, the rotating of the primary sheave may be based on the command.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 29 is an illustration of an online platform consistent with various embodiments of the present disclosure.

DETAIL DESCRIPTIONS OF THE INVENTION

Figure 1:
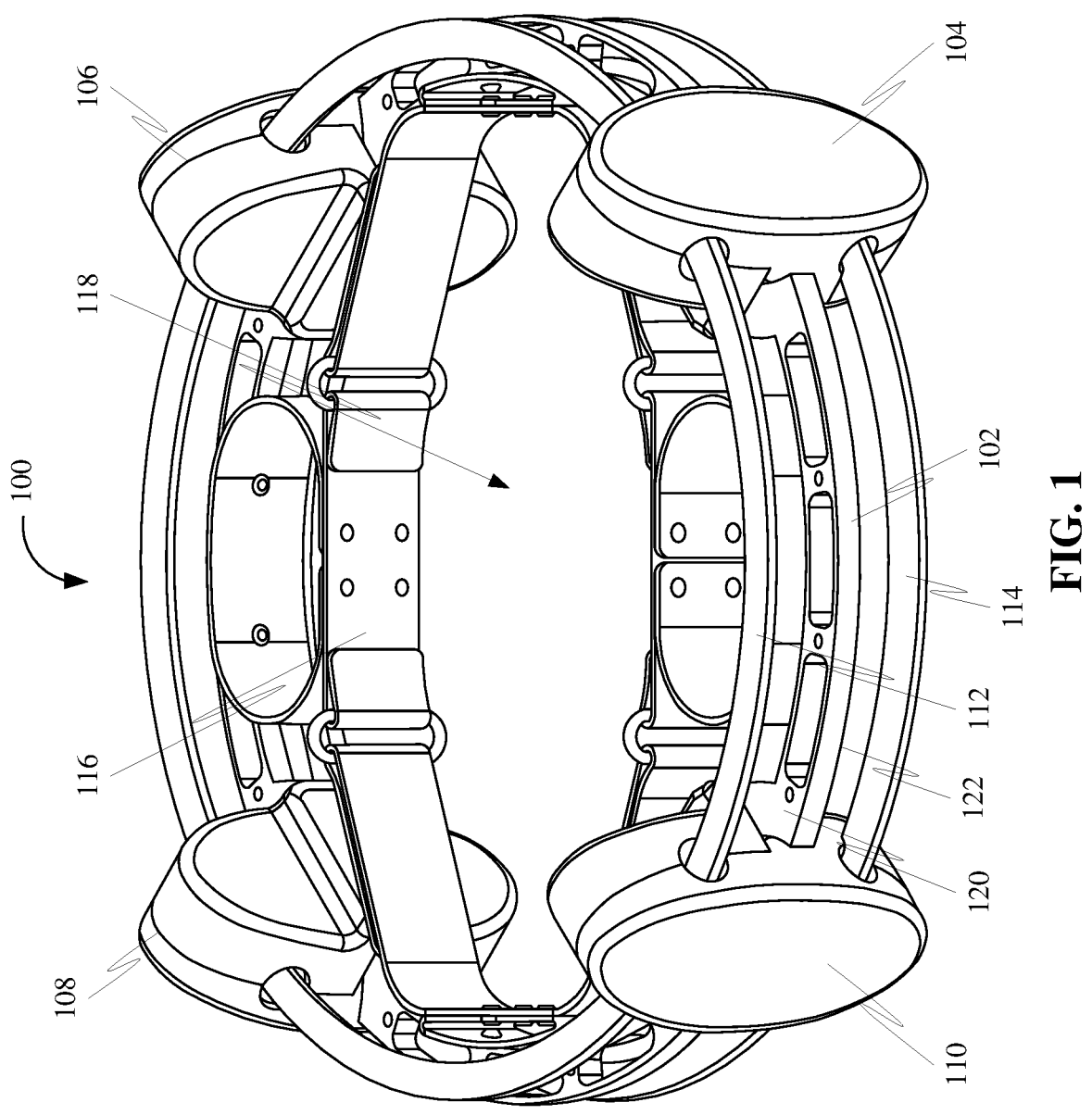
FIG. 1 is a top perspective view of an apparatus for providing a balance to objects attached to the apparatus, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for providing a balance to objects, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the processing device may include a computing device with at least one processing unit. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the communication device may include a computing device with at least one communication connection. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Further, the storage device may include a computing device with at least one memory. Accordingly, in some embodiments, the storage device may be based on technologies such as, but not limited to, data compression, data backup, data redundancy, deduplication, error correction, data finger-printing, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users.

Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for providing a balance to objects.

Further, the present disclosure describes a cybernetic balance enhancing method and apparatus. Further, the cybernetic balance enhancing method and apparatus provides balancing ability and safety. Further, the cybernetic balance enhancing apparatus is to be worn by its user. Further, the disclosed apparatus is configured to be attached to a belt or harness and worn in the customary position as a waist belt. Power is preferably provided by a battery in or around the device or through a power cord.

Further, the disclosed apparatus includes hoops (gyroscopic hoops) that rotate around the user's waist, like a hula-hoop, when powered by electric motors. Further, the disclosed apparatus may include a motor mount for mounting the motors and bearings. Further, the disclosed apparatus may also include a frame mount for mounting the motor mount to the frame. The entire assembly is synchronized to eliminate any rotational torque, and preferably controlled through an onboard computer that learns the habits of its user with AI autonomously and carries out those actions that are the most beneficial to its user. Manual interruption by the user may take place through a proximate control panel or through a connected smart device. Sensors, both biometric and movement are located within the device as well as a connected smart device, e.g. smartwatch. These signals detect the needs of the user and react accordingly.

Control features are preferably provided so that the user can vary the amount of balance manually through an integrated control panel, or via Bluetooth to a smart device. Optionally, the disclosed apparatus can be operated purely Autonomous or in concert with manual input where the level of balance is increased through an algorithm that measures the output of biometric sensors as well as accelerometers, barometers, and GPS positioning to match the needs of the user to the level of balance provided by the device. An example to prevent an unexpected fall or the anticipation of a fall is through increased heart rate, blood pressure, EKG, or other means.

As an example, when a potential fall is detected, the device activates to keep the user from falling. Biometric responses ahead of physical movements can detect an oncoming fall that will activate the device. Power is supplied by a battery or external power.

Further, the present disclosure describes a stabilizing belt or harness method and apparatus for increasing natural balancing abilities as well as controlling falls and assisting with physical therapy in a wearable clothing accessory.

Further, the disclosed apparatus increases an individual's ability to balance above their current physical abilities. If they are frail, a person can regain mobility and help to ward off injury, a sports enthusiast can use the disclosed apparatus to train to do everything from surfing/skateboarding to walking on a tight rope for the first time. A professional athlete or extreme athlete will be able to make maneuvers that were next to impossible before using the disclosed apparatus.

Inertia (balance) is created by two or more toroidal shaped hoops the rotate around the person's body on the horizontal plane turning the user of the device into a human top or gyroscope, although of course, their body does not spin, just the hoops around their body. Alternative embodiments could locate the disclosed apparatus so that it operates in a vertical place. The hoops are sized in both diameter and weight to meet the needs of the users. The rate of the rotation of the hoops and their mass dictates the amount of inertia. Drive motors where both the number and size of the motors are optimized to meet the desired level of balance cause rotation of the hoops. Sheeves (sheaves) that surround the motors locate the hoops above and below the axis of rotation causing the two hoops to rotate in opposite directions. Proximate bearings with sheeves keep the hoops pressed against the motor sheeves. Further, the upper and lower bearings of the proximate bearings hold the hoops against the sheeves of the motor (drive motor). In alternate embodiments, the device can be sized to be worn around a limb, such as an arm or leg, to provide specific areas where enhanced balance is beneficial. The sheeves integrate bands to minimize slippage of the hoops. A central frame locates the motors in their optimal position and supplies the necessary rigidity for operation. A harness (belt) connects the user to the frame where the inertia force is transferred. A shoulder harness can be added to the device when necessary. Further, the amount of inertia can be controlled by the user directly with an onboard interface, through a smart device remotely, and/or autonomously using signals generated by the sensors located in the device itself and/or smart device including biometric and movement electronics. An application installed in a smart device utilizes artificial intelligence to learn the habits of the user and alter the functions of the disclosed apparatus to better meet the requirements of the user by interpreting signals from proximate sensors. Further, the power is preferably supplied by batteries located near or proximate to the device. Further, the power can alternately be supplied by hard wire to an exterior source. Further, recharging can be through the hard wire to a charging device or remotely through a wireless charger. When manually operating the device, inputs can be through a dial, touch screen, or any suitable manner whose interface is located on the disclosed apparatus. The user can set when the device turns on, the amount of balance, and a trigger mechanism where the device will turn on automatically when, for example, the beginning of a slip or fall is being detected by an onboard computer/sensor. On the other hand, heightening the amount of balance during an extreme maneuver. Further, Artificial Intelligence may be employed to learn the activities of the user and adapt the balancing effort and reaction to the user as the device learns the activities of the user. The AI can be located within the computer integrated into the device, smart device, or outside control method.

The disclosed apparatus, when operated remotely through a smart device using either Bluetooth, Wi-Fi, or any suitable manner. The smart device will accept manual inputs through an app created for the device, or will automatically operate the disclosed apparatus based on the user's requests/requirements utilizing motion sensors and any other appropriate sensors as to the operation of the disclosed apparatus. Manual inputs can also be supplemented with the autonomous operation when requested. When a smartwatch is utilized, sensors in the smartwatch use biometric sensors (heart rate monitor, blood pressure, EKG, and others) as well as motion sensors (GPS, barometers, and others) and special sensors. Further, feed signals are fed into the app and a prescribed algorithm will turn the inputs into a signal that will operate the device based on the needs of the user.

Further, the disclosed apparatus may be hard-wired to a controller, for example, if the device is being used in a factory when the user is operating equipment, the device could be plugged into a control panel on a wall to control its operation Further, the disclosed apparatus may integrate a two way communication system, to be used with Dr.'s Physical therapists, sports coaches, or any person the user wants to receive data from the device. This two way communication can also allow the person communicating through the device to be able to control the device at the user's wish. In an emergency situation, the device can detect when the user is injured and contact an early responder.

Further, the disclosed apparatus may also be configured to stabilize walkers, canes, crutches, or anything that is used to help support the user. Additional non-human uses can include larger versions that stabilize cars and trucks from tipping over, personal air vehicles to maintain stability, boats both powered and unpowered such as sailboats, and static structures to help minimize twisting in large winds, earthquakes, and any other influences that could affect the movement of the structure.

Further, the present disclosure describes a stabilizing medical belt or harness method and apparatus for amplifying a person's natural balance to above their current capabilities. Further, the disclosed apparatus creates an inertia envelope that surrounds the user through counter rotating hoops that surround the user and are harnessed to their waist. Further, the disclosed apparatus may include a plurality of drive motors connected to the hoops to cause rotation of the hoops. Further, the power is preferably provided by a battery pack located on the belt or harness. Further, the disclosed apparatus produces a strong stabilizing effect when activated by a central computer, smart device, or manually by the user Further, the present disclosure describes an autonomous activation of the disclosed apparatus through signals created by biometric sensors as well as accelerometers, GPS, barometers, and others located in the device or connected through Bluetooth/Wi-Fi, or hardwire connected smart devices.

Further, the present disclosure describes an Artificial intelligence that learns the needs of the user and creates the necessary algorithms through sensors and/or manual controls to meet the needs of the user.

Further, the present disclosure relates to the field of assistive devices used to train sports enthusiasts and athletes. More specifically, the present disclosure describes increasing an amateur or professional enthusiast/athlete balancing abilities beyond what is humanly possible.

Further, the present disclosure describes an apparatus for enhancing balancing of objects. Further, the apparatus may include an annular frame, at least one motor assembly, two or more hoops, a harness, and at least one power source. Further, the annular frame may include a central cavity around a central axis of the annular frame. Further, the annular frame may be configured for receiving at least one portion of at least one object through the central cavity. Further, the at least one object may include a building structure, a vehicle, a person, etc. Further, the central cavity may be associated with at least one cavity diameter for allowing the receiving of the at least one portion of the at least one object. Further, in some embodiments, the at least one object may include at least one user. Further, the receiving of the at least one portion of the at least one object may include receiving at least one body part of the at least one user. Further, the receiving of the at least one body part of the at least one user allows the at least one user to wear the apparatus on the at least one body part of the at least one user. Further, the at least one motor assembly may be coupled to the annular frame in at least one position. Further, a motor assembly of the at least one motor assembly may include a motor mount, a frame mount, a motor, a primary sheave, and two or more secondary sheaves. Further, the motor mount may be configured for mounting the motor on a central portion of the motor mount. Further, the motor mount may be configured for mounting the two or more secondary sheaves on two or more opposing end portions of the motor mount. Further, the two or more secondary sheaves may include a first secondary sheave and a second secondary sheave. Further, the first secondary sheave may be disposed on a first axial side of the annular frame and the second secondary sheave may be disposed on a second axial side of the annular frame based on the mounting of the two or more secondary sheaves on the two or more opposing end portions of the motor mount. Further, the primary sheave may be mechanically coupled with a rotating shaft of the motor. Further, the frame mount may be configured for mounting the motor mount to the annular frame. Further, the two or more hoops may include a first hoop and a second hoop. Further, the first hoop may be coaxially disposed on the first axial side and the second hoop may be coaxially disposed on the second axial side. Further, the first hoop may be contactably disposed on a first portion of a primary grooved surface of the primary sheave and the second hoop may be contactably disposed on a second portion of the primary grooved surface. Further, the first portion of the primary grooved surface diametrically opposes the second portion of the primary grooved surface. Further, the first secondary sheave may be configured for rotatably holding the first hoop against the first portion of the primary grooved surface and the second secondary sheave may be configured for rotatably holding the second hoop against the second portion of the primary grooved surface. Further, the motor may be configured for rotating the primary sheave with at least one speed around a first axis in at least one rotation direction. Further, the first axis may form at least one of at least one angle with the central axis. Further, in some embodiments, the first axis may form a right angle with the central axis. Further, the rotating of the primary sheave with the at least one speed in the at least one rotation direction rotates the first hoop around the central axis in a first rotation direction with at least one first speed. Further, the rotating of the primary sheave with the at least one speed in the at least one rotation direction rotates the second hoop around the central axis in a second rotation direction opposite to the first rotation direction with at least one second speed. Further, the two or more hoops may include two or more toroidal shaped hoops. Further, in some embodiments, each hoop of the two or more hoops may be associated with a hoop diameter and a hoop weight. Further, the at least one first speed of the first hoop may correspond to a first hoop diameter and a first hoop weight of the first hoop. Further, the at least one second speed of the second hoop may correspond to a second hoop diameter and a second hoop weight of the second hoop. Further, in some embodiments, the at least one first speed of the first hoop and the at least one second speed of the second hoop may correspond to the at least one angle formed between the first axis and the central axis. Further, the harness may be configured for attaching the annular frame to the at least one portion of the at least one object. Further, rotating of the first hoop in the first rotation direction with the at least one first speed and rotating of the second hoop in the second rotation direction with the at least one second speed generates at least one degree of gyroscopic stability corresponding to the at least one first speed of the first hoop and the at least one second speed of the second hoop. Further, the attaching of the annular frame to the at least one portion of the at least one object transfers the gyroscopic stability to the at least one portion of the at least one object. Further, transferring of the gyroscopic stability enhances the balancing of the at least one object. Further, in some embodiments, the harness may be configured for detachably attaching the annular frame to the at least one portion of the at least one object. Further, in some embodiments, the attaching of the annular frame to the at least one portion of the at least one object may include attaching the annular frame to the at least one body part of the at least one user. Further, wearing of the apparatus on the at least one body part of the at least one user may be based on the attaching of the annular frame to the at least one body part of the at least one user. Further, the attaching of the annular frame to the at least one body part of the at least one user transfers the gyroscopic stability to the at least one body part of the at least one user. Further, the transferring of the gyroscopic stability to the at least one body part of the at least one user enhances the balancing of the at least one body part of the at least one user. Further, the at least one power source may be coupled with the motor. Further, the at least one power source may be configured for powering the motor. Further, the at least one power source may include at least one battery. Further, the powering may include providing electrical power to the motor.

Further, the apparatus may include a housing. Further, the housing may include at least one interior space. Further, the two or more hoops, the annular frame, the at least one motor assembly, and the at least one power source may be disposed in the at least one interior space.

Further, the apparatus may include at least one motion sensor and a controller. Further, the controller may be a processing device. Further, the at least one motion sensor may be disposed on the apparatus. Further, the at least one motion sensor may be configured for generating at least one motion sensor data based on at least one movement of the at least one portion of the at least one object. Further, the controller may be disposed on the apparatus. Further, the controller may be communicatively coupled with the at least one motion sensor. Further, the controller may be configured for analyzing the at least one motion sensor data. Further, the controller may be configured for determining at least one movement status of the at least one portion of the at least one object. Further, the controller may be configured for generating at least one command based on the determining of the at least one movement status of the at least one portion of the at least one object. Further, the controller may be operationally coupled with the motor. Further, the controller may be configured for controlling the rotating of the primary sheave based on the at least one command. Further, the controlling of the rotating of the primary sheave may include controlling the at least one speed and the at least one rotation direction of the primary sheave. Further, the controlling of the at least one speed and the at least one rotation direction may include controlling of the at least one first speed of the first hoop and the at least one second speed of the second hoop and controlling of the first rotation direction of the first hoop and the second rotation direction of the second hoop. Further, the controlling of the at least one first speed of the first hoop and the at least one second speed of the second hoop and the controlling of the first rotation direction of the first hoop and the second rotation direction of the second hoop may include controlling the at least one degree of the gyroscopic stability generated by the rotating of the first hoop and the second hoop. Further, in an embodiment, the generating of the at least one motion sensor data based on at least one movement of the at least one portion of the at least one object may include generating of the at least one motion sensor data based on the at least one movement of the at least one body part of the at least one user. Further, the determining of the at least one movement status of the at least one portion of the at least one object may include determining of the at least one movement status of the at least one body part of the at least one user. Further, the generating of the at least one command based on the determining of the at least one movement status of the at least one portion of the at least one object may include generating of the at least one command based on the determining of the at least one movement status of the at least one body part of the at least one user. Further, in an embodiment, the analyzing of the at least one motion sensor data may include analyzing the at least one motion sensor data using at least one machine learning model. Further, the determining of the at least one movement status of the at least one body part of the at least one user may include predicting the at least one movement status of the at least one body part of the at least one user based on the analyzing of the at least one motion sensor data using the at least one machine learning model. Further, the generating of the at least one command may be based on the predicting of the at least one movement status of the at least one body part of the at least one user.

Further, the apparatus may include at least one biometric sensor and a controller. Further, the at least one biometric sensor may be disposed on the apparatus. Further, the at least one biometric sensor may be configured for generating at least one biometric data based on at least one of a physical state and a physiological state of the at least one user. Further, the controller may be disposed on the apparatus. Further, the controller may be communicatively coupled with the at least one biometric sensor. Further, the controller may be configured for analyzing the at least one biometric data. Further, the controller may be configured for determining at least one of a physical status and a physiological status of the at least one user. Further, the controller may be configured for generating at least one first command based on the determining of at least one the physical status and the physiological status of the at least one user. Further, the controller may be operationally coupled with the motor. Further, the controller may be configured for controlling the rotating of the primary sheave based on the at least one first command. Further, the controlling of the rotating of the primary sheave may include controlling the at least one speed and the at least one rotation direction of the primary sheave. Further, the controlling of the at least one speed and the at least one rotation direction may include controlling of the at least one first speed of the first hoop and the at least one second speed of the second hoop and controlling of the first rotation direction of the first hoop and the second rotation direction of the second hoop. Further, the controlling of the at least one first speed of the first hoop and the at least one second speed of the second hoop and the controlling of the first rotation direction of the first hoop and the second rotation direction of the second hoop may include controlling the at least one degree of the gyroscopic stability generated by the rotating of the first hoop and the second hoop. Further, in an embodiment, the analyzing of the at least one biometric data may include analyzing the at least one biometric data using at least one first machine learning model. Further, the determining of at least one of the physical status and the physiological status of the at least one user may include predicting at least one of the physical status and the physiological status of the at least one user based on the analyzing of the at least one biometric data using the at least one first machine learning model. Further, the generating of the at least one first command may be based on the predicting of at least one of the physical status and the physiological status of the at least one user.

Further, the controller may be configured for generating at least one alert based on the determining of at least one of the physical status and the physiological status of the at least one user. Further, the apparatus may include a communication device communicatively coupled with the controller. Further, the communication device may be configured for transmitting the at least one alert to at least one external device.

Further, the apparatus may include a communication device and a controller. Further, the communication device may be disposed on the apparatus. Further, the communication device may be configured for receiving at least one operating request from at least one user device over at least one of a wired communication channel and a wireless communication channel. Further, the controller may be disposed on the apparatus. Further, the controller may be communicatively coupled with the communication device. Further, the controller may be configured for analyzing the at least one operating request. Further, the controller may be configured for determining at least one operating parameter based on the analyzing of the at least one operating request. Further, the at least one operating parameter may include a degree of balancing required by the at least one user. Further, the controller may be configured for generating at least one second command based on the determining of the at least one operating parameter. Further, the controller may be operationally coupled with the motor. Further, the controller may be configured for controlling the motor based on the at least one second command. Further, the controlling of the rotating of the primary sheave may include controlling the at least one speed and the at least one rotation direction of the primary sheave. Further, the controlling of the at least one speed and the at least one rotation direction may include controlling of the at least one first speed of the first hoop and the at least one second speed of the second hoop and controlling of the first rotation direction of the first hoop and the second rotation direction of the second hoop. Further, the controlling of the at least one first speed of the first hoop and the at least one second speed of the second hoop and the controlling of the first rotation direction of the first hoop and the second rotation direction of the second hoop may include controlling the at least one degree of the gyroscopic stability generated by the rotating of the first hoop and the second hoop. Further, the degree of balancing corresponds to the at least one degree of the gyroscopic stability.

Further, the apparatus may include at least one input device and a controller. Further, the at least one input device may be disposed on the apparatus. Further, the at least one input device may be configured for generating at least one operating request based on at least one input action received by the at least one input device. Further, the controller may be disposed on the apparatus. Further, the controller may be communicatively coupled with the at least one input device. Further, the controller may be configured for analyzing the at least one operating request. Further, the controller may be configured for determining at least one operating parameter based on the analyzing of the at least one operating request. Further, the controller may be configured for generating at least one third command based on the determining of the at least one operating parameter. Further, the controller may be operationally coupled with the motor. Further, the controller may be configured for controlling the motor based on the at least one third command. Further, the controlling of the rotating of the primary sheave may include controlling the at least one speed and the at least one rotation direction of the primary sheave. Further, the controlling of the at least one speed and the at least one rotation direction may include controlling of the at least one first speed of the first hoop and the at least one second speed of the second hoop and controlling of the first rotation direction of the first hoop and the second rotation direction of the second hoop. Further, the controlling of the at least one first speed of the first hoop and the at least one second speed of the second hoop and the controlling of the first rotation direction of the first hoop and the second rotation direction of the second hoop may include controlling the at least one degree of the gyroscopic stability generated by the rotating of the first hoop and the second hoop.

FIG. 1 is a top perspective view of an apparatus 100 for providing a balance to objects attached to the apparatus 100, in accordance with some embodiments. Accordingly, the apparatus 100 may include an annular body 102, a plurality of drive assemblies 104-110, two hoops 112-114, and a harness 116.

Further, the annular body 102 may include a central cavity 118 about a central axis of the annular body 102. Further, the annular body 102 may be configured for receiving an object in the central cavity 118 for placing the annular body 102 around the object. Further, the annular body 102 may be a frame. Further, the frame may be an annular frame. Further, the object may include a walker, a cane, a crutch, a walking stick, a body of an individual, a vehicle, a static structure, etc.

Figure 2:
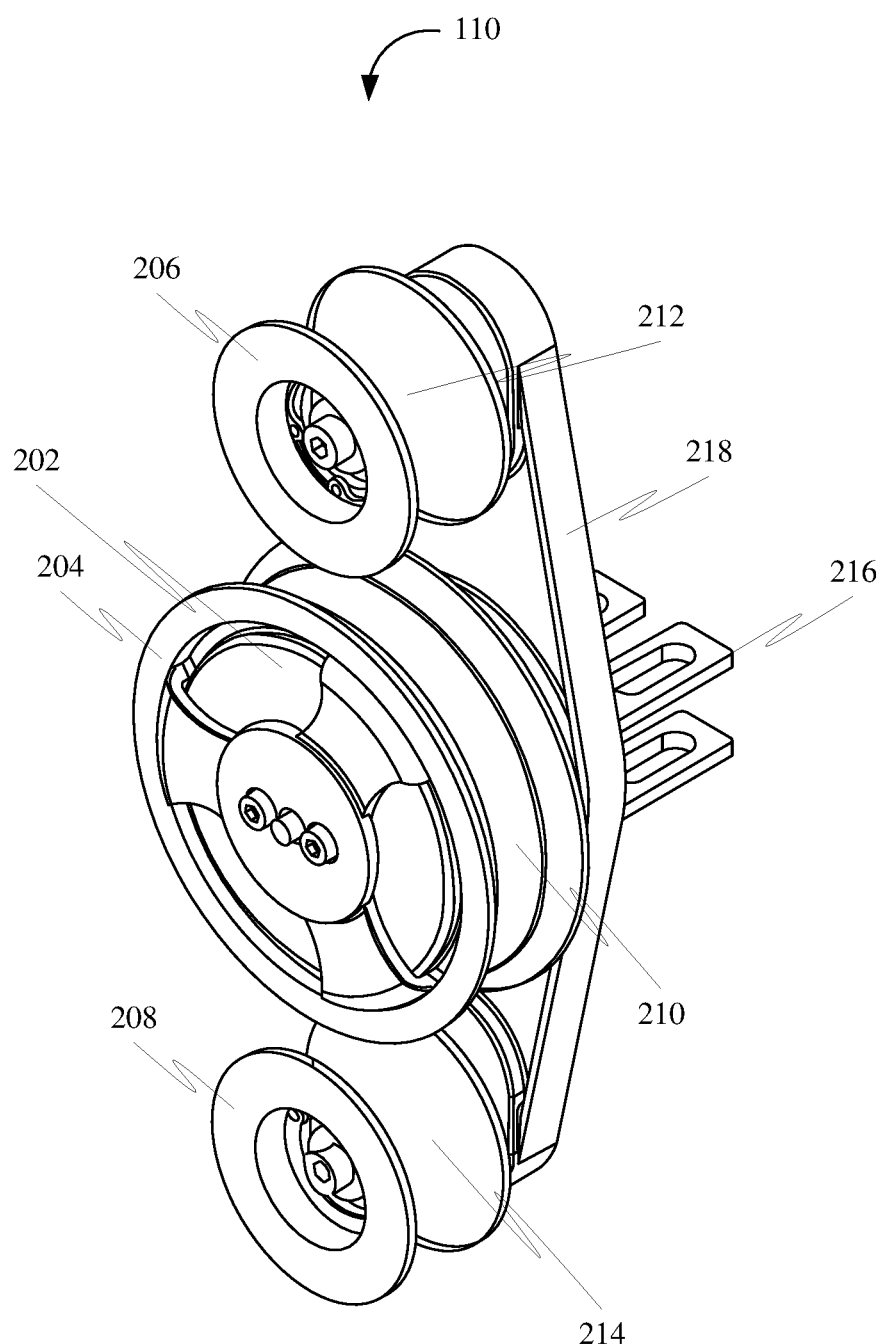
FIG. 2 is a front perspective view of a drive assembly of the plurality of drive assemblies of the apparatus, in accordance with some embodiments.

Further, the plurality of drive assemblies 104-110 may be mounted to the annular body 102. Further, the plurality of drive assemblies 104-110 may be motor assemblies. Further, each of the plurality of drive assemblies 104-110 may include a motor 202, a primary sheave 204, and two secondary sheaves 206-208. Further, the motor 202 may be electrically powered using at least one battery disposed on the annular body 102. Further, the motor 202 may include a servo motor, a stepper motor, a BLDC motor, etc. Further, the primary sheave 204 may be radially and rotatably disposed on the annular body 102, a first secondary sheave 206 of the two secondary sheaves 206-208 may be rotatably disposed on a top side 120 of the annular body 102 above the primary sheave 204, and a second secondary sheave 208 of the two secondary sheaves 206-208 may be rotatably disposed on a bottom side 122 opposite to the top side 120 of the annular body 102 below the primary sheave 204 based on the mounting of each of the plurality of drive assemblies 104-110 on the annular body 102. Further, the top side 120 may be a first axial side of the annular body 102 and the bottom side 122 may be a second axial side of the annular body 102. Further, the primary sheave 204 and the two secondary sheaves 206-208 may be coplanar. Further, the motor 202 may be mechanically coupled with the primary sheave 204. Further, a shaft of the motor 202 may be attached to a hub of the primary sheave 204. Further, the motor 202 may be configured for rotating the primary sheave 204 about a sheave axis perpendicular to the central axis in at least one direction with at least one speed. Further, the rotating of the primary sheave 204 may include synchronously rotating the primary sheave 204 of each of the plurality of drive assemblies 104-110. Further, the plurality of drive assemblies 104-110 may be mounted to the annular body 102 on a plurality of locations on the annular body 102. Further, the plurality of locations may include two pairs of diametrically opposite locations on the annular body 102. Further, in an embodiment, each of the plurality of drive assemblies 104-110 may be mounted to the annular body 102 using a frame mount 216, as shown in FIG. 2. Further, the annular body 102 securely receives the frame mount 216 for the mounting of each of the plurality of drive assemblies 104-110 to the annular body 102. Further, in an embodiment, the primary sheave 204 may be radially and rotatably disposed on the annular body 102, the first secondary sheave 206 of the two secondary sheaves 206-208 may be rotatably disposed on the top side 120 of the annular body 102 above the primary sheave 204, and the second secondary sheave 208 of the two secondary sheaves 206-208 may be rotatably disposed on the bottom side 122 opposite to the top side 120 of the annular body 102 below the primary sheave 204 using a motor mount 218, as shown in FIG. 2. Further, the motor mount 218 may include a central portion, a first end portion, and a second end portion. Further, the central portion may be attached to the 102 using the frame mount 216 for radially and rotatably disposing the primary sheave 204 on the annular body 102, rotatably disposing the first secondary sheave 206 on the annular body 102, and rotatably disposing the second secondary sheave 208 on the annular body 102. Further, the first end portion may extend towards the top side 120 and the second end portion may extend towards the bottom side 122. Further, the first secondary sheave 206 may be rotatably mounted on the first end portion and the second secondary sheave 208 may be rotatably mounted on the second end portion.

Further, the two hoops 112-114 may include a first hoop 112 and a second hoop 114. Further, the two hoops 112-114 may be gyroscopic hoops. Further, the first hoop 112 may be coaxially disposed on the top side 120 and rotatably supported between a primary groove surface 210 of the primary sheave 204 and a first secondary groove surface 212 of the first secondary sheave 206. Further, the second hoop 114 may be coaxially disposed on the bottom side 122 and rotatably supported between the primary groove surface 210 and a second secondary groove surface 214 of the second secondary sheave 208. Further, the rotating of the primary sheave 204 rotates the first hoop 112 in a first direction with at least one hoop speed about the central axis and the second hoop 114 in a second direction opposite to the first direction with the at least one hoop speed about the central axis for generating the balance. Further, the first direction may be a clockwise direction and the second direction may be a counterclockwise direction. Further, the balance may correspond to a gyroscopic stability. Further, the balance may be an ability to maintain the line of gravity of the object within a base of support with minimal postural sway. Further, in an embodiment, the first secondary sheave 206 may be an upper bearing and the second secondary sheave 208 may be a lower bearing. Further, the upper bearing and the lower bearing may be configured for holding the two hoops 112-114 against the primary sheave 204. Further, the first hoop 112 may be rotatably supported between the primary groove surface 210 of the primary sheave 204 and the first secondary groove surface 212 of the first secondary sheave 206 and the second hoop 114 may be rotatably supported between the primary groove surface 210 and a second secondary groove surface 214 based on the holding. Further, the primary sheave 204 may be a motor sheave.

Further, the harness 116 may be configured for attaching the apparatus 100 to the object after the receiving of the object in the central cavity 118. Further, the attaching of the apparatus 100 to the object provides the balance to the object based on the generating. Further, the harness may be a belt harness. Further, the object may be a body of a user. Further, the belt harness attaches the apparatus 100 to a waist of the body of the user.

Further, in some embodiment, the balance may be associated with a balance level corresponding to each of the at least one hoop speed of the two hoops 112-114. Further, the balance level of the balance prevents an instance of a disbalance associated with a disbalance level smaller than the balance level in the object. Further, the balance level may correspond to an amount of the gyroscopic stability. Further, the disbalance may be a tendency of the object to fall, roll, tumble, etc. Further, the disbalance may be a tendency of the object to lose the balance.

Figure 6:
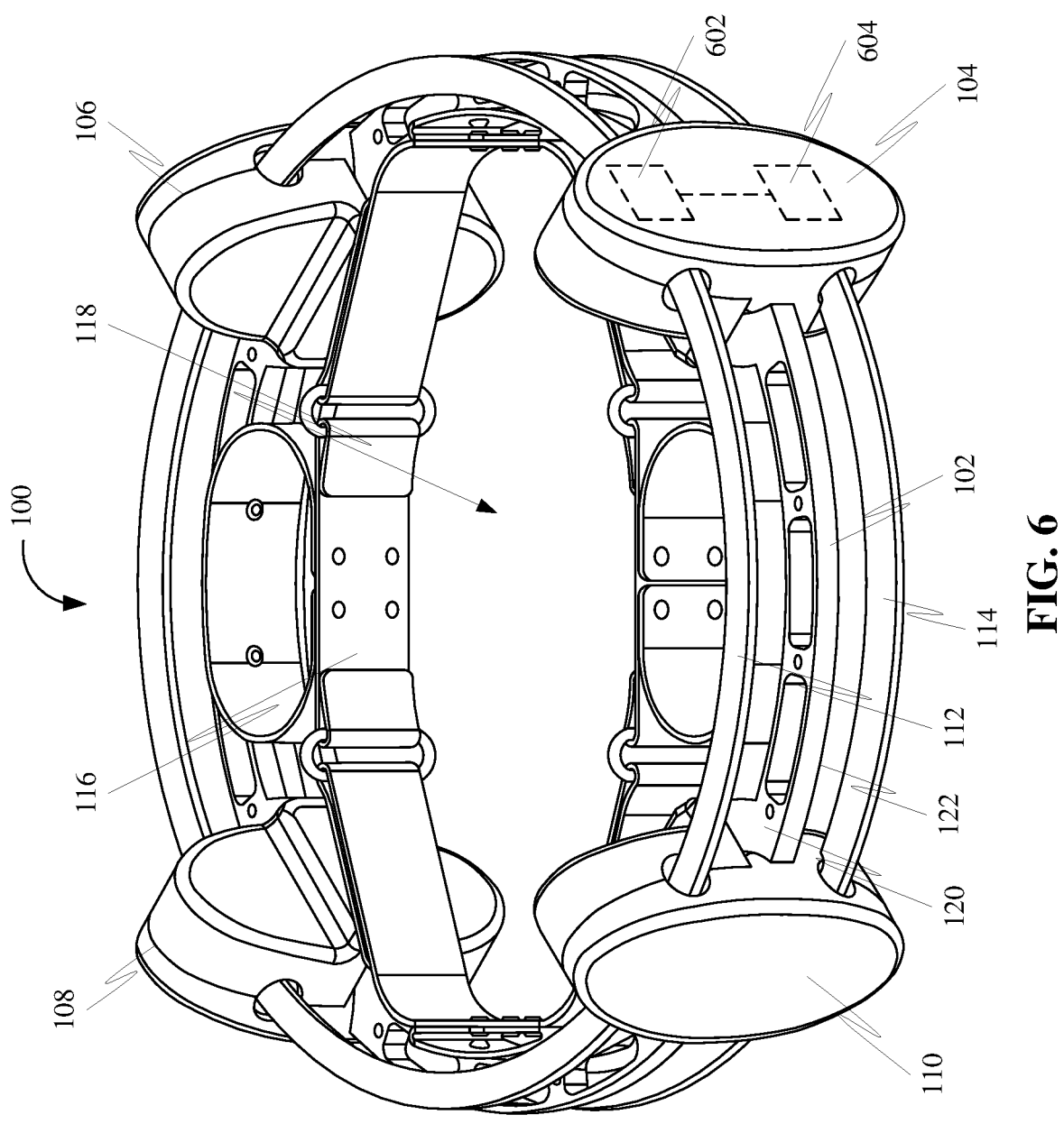
FIG. 6 is a top perspective view of the apparatus, in accordance with some embodiments.

In an embodiment, the apparatus 100 may include at least one motion sensor 602 and a processing device 604, as shown in FIG. 6. Further, the at least one motion sensor 602 and the processing device 604 may be disposed on the annular body 102. Further, the annular body 102 comprises an assembly housing for each of the plurality of drive assemblies 104-110 for housing each of the plurality of drive assemblies 104-110. Further, the at least one motion sensor 602 and the processing device 604 may be disposed on the assembly housing. Further, the at least one motion sensor 602 may be configured for generating at least one motion data based on detecting a movement associated with the object. Further, the processing device 604 may be communicatively coupled with the at least one motion sensor 602. Further, the processing device 604 may be configured for analyzing the at least one motion data. Further, the processing device 604 may be configured for determining the instance of the disbalance in the object based on the analyzing. Further, the processing device 604 may be configured for generating a command for the motor 202 of each of the plurality of drive assemblies 104-110 based on the determining. Further, the motor 202 of each of the plurality of drive assemblies 104-110 may be communicatively coupled with the processing device 604. Further, the rotating of the primary sheave 204 may be based on the command. Further, in an embodiment, the determining of the instance of the disbalance may include determining the disbalance level of the instance of the disbalance in the object based on the analyzing. Further, the processing device 604 may be configured for determining the balance level of the balance required by the object based on the disbalance level of the instance of the disbalance in the object. Further, the processing device 604 may be configured for determining one of the at least one direction and one of the at least one speed for the rotating of the primary sheave 204 based on the determining of the balance level of the balance. Further, the rotating of the primary sheave 204 with one of the at least one speed rotates the two hoops 112-114 with one of the at least one hoop speed for the generating of the balance of the balance level. Further, the generating of the command may be based on the determining of one of the at least one direction and one of the at least one speed. Further, the rotating of the primary sheave 204 may include rotating the primary sheave 204 in one of the at least one direction with one of the at least one speed based on the command. Further, in an embodiment, the analyzing of the at least one motion data may include analyzing the at least one motion data using a first machine learning model. Further, the first machine learning model may be trained for detecting instances of disbalance in the object happening in future times based on movements of the object. Further, the determining of the instance of the disbalance may include predicting the instance of the disbalance happening in a future time in the object based on the analyzing of the at least one motion data using the first machine learning model. Further, the generating of the command may be based on the predicting.

Figure 7:
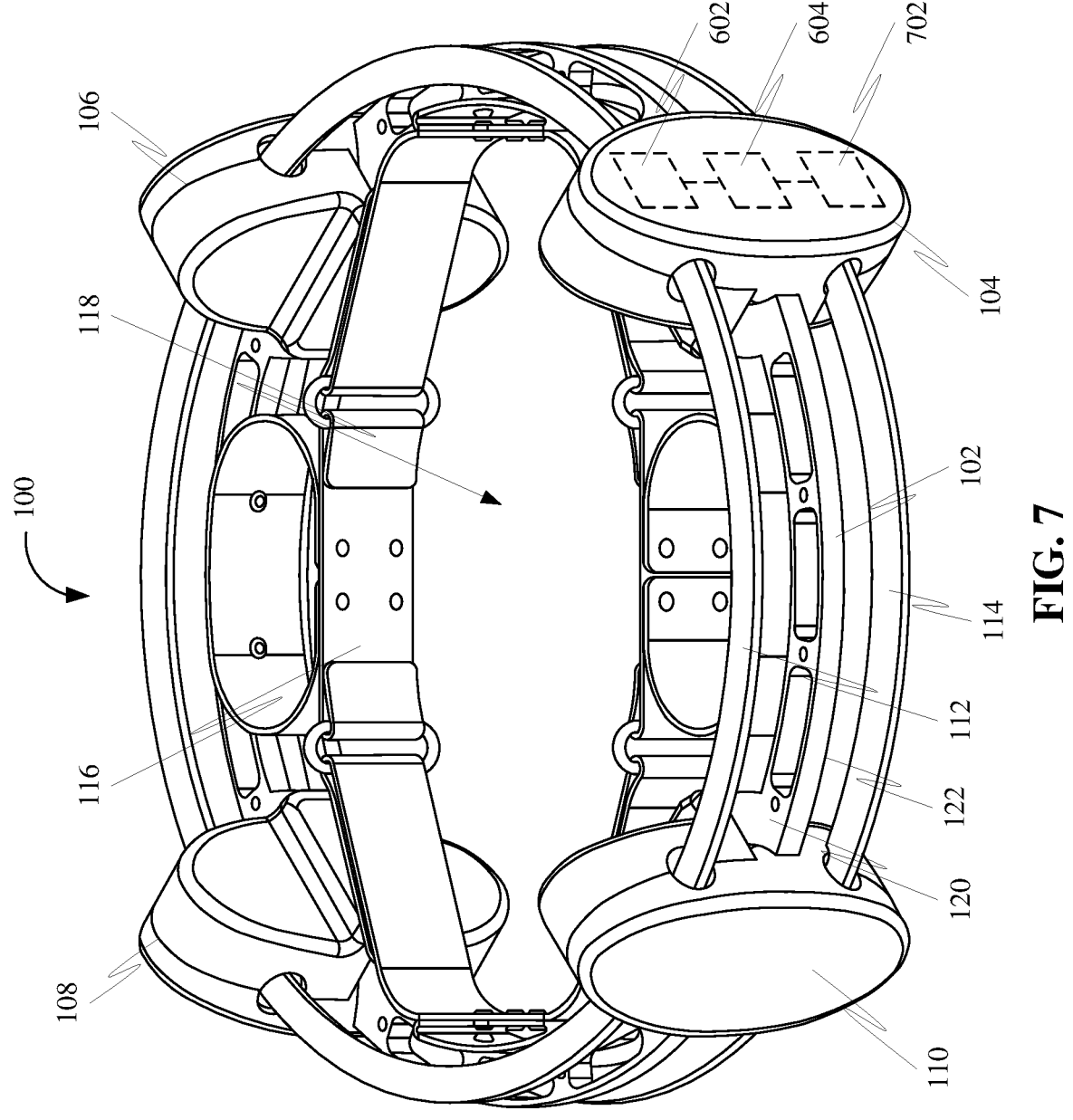
FIG. 7 is a top perspective view of the apparatus, in accordance with some embodiments.

Further, in an embodiment, the object may include a body of a user. Further, the apparatus 100 may include at least one biometric sensor 702, as shown in FIG. 7, communicatively coupled with the processing device 604. Further, the at least one biometric sensor 702 may be disposed on the assembly housing of the annular body 102. Further, the at least one biometric sensor 702 may be configured for generating at least one biometric data based on detecting a physiological state of the user. Further, the at least one biometric sensor 702 may include a heartbeat sensor, a blood pressure sensor, a EKG sensor, a respiratory rate sensor, a pulse meter, etc. Further, the physiological state may include a heart rate, a blood pressure, a pulse, a respiration rate, etc. Further, the processing device 604 may be configured for analyzing the at least one biometric data. Further, the determining of the instance of the disbalance in the object comprising the body may be based on the analyzing of the at least one biometric data. Further, in an embodiment, the analyzing of the at least one biometric data may include analyzing the at least one biometric data using a second machine learning model. Further, the second machine learning model may be trained for detecting instances of the disbalance in the object comprising the body happening in future times based on physiological states of the user. Further, the determining of the instance of the disbalance in the object comprising the body may include predicting the instance of the disbalance happening in a future time in the body based on the analyzing of the at least one biometric data using the second machine learning model. Further, the generating of the command may be based on the predicting.

Figure 8:
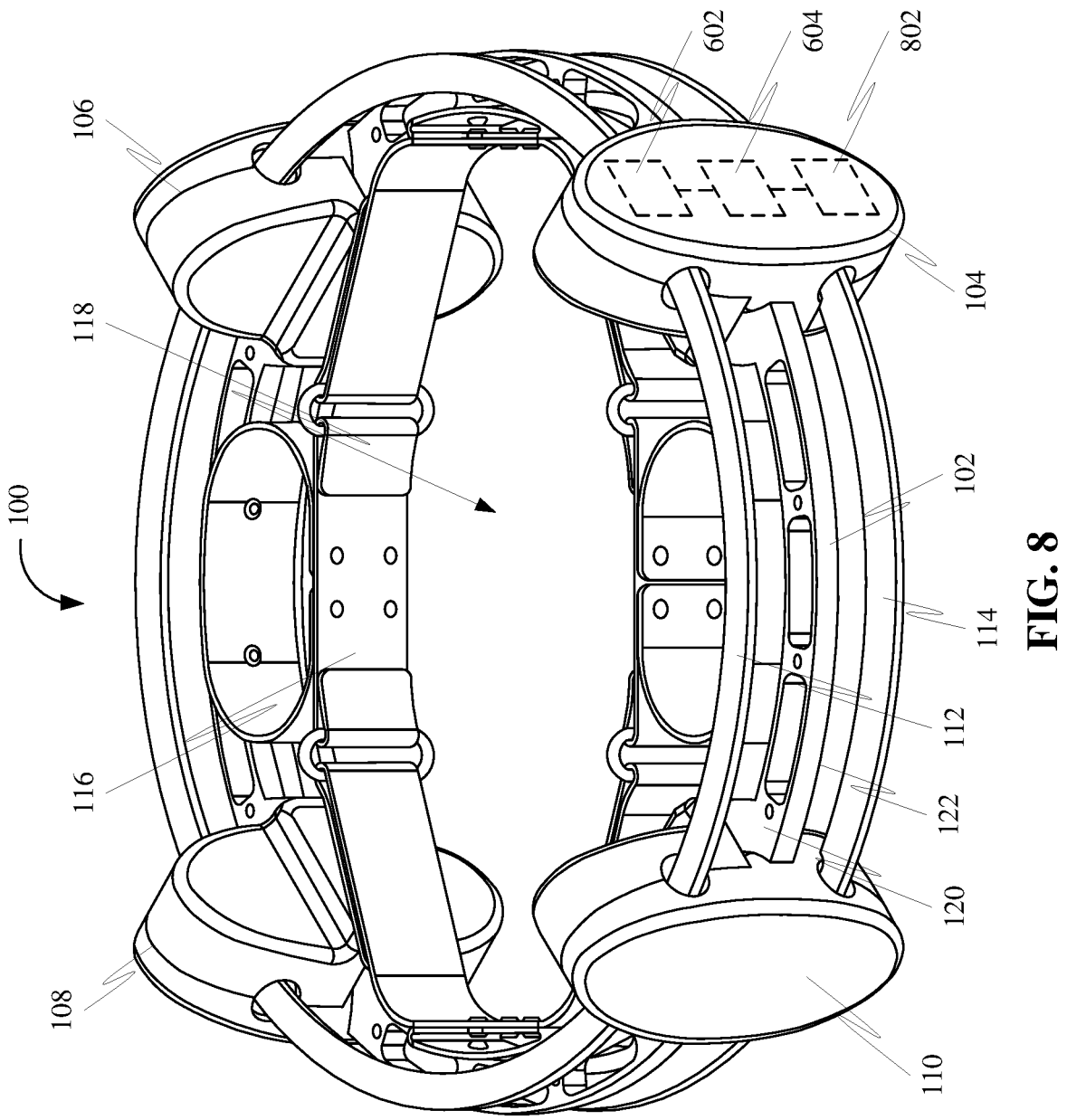
FIG. 8 is a top perspective view of the apparatus, in accordance with some embodiments.

In an embodiment, the apparatus 100 may include at least one environment sensor 802, as shown in FIG. 8, communicatively coupled with the processing device 604. Further, the at least one environment sensor 802 may be disposed on the assembly housing of the annular body 102. Further, the at least one environment sensor 802 may include a wind sensor, a seismic sensor, etc. Further, the at least one environment sensor 802 may be configured for generating at least one environment data based on detecting a presence of an environmental factor in an environment of the object. Further, the environment may be a surrounding of the object. Further, the environmental factor may include a wind speed, a seismic activity, etc. Further, the processing device 604 may be configured for analyzing the at least one environment data. Further, the determining of the instance of the disbalance in the object may be based on the analyzing of the at least one environment data. Further, in an embodiment, the analyzing of the at least one environment data may include analyzing the at least one environment data using a third machine learning model. Further, the third machine learning model may be trained for detecting instances of disbalance in the object happening in future times based on influences of environmental factors on the object. Further, the determining of the instance of the disbalance in the object may include predicting the instance of the disbalance happening in a future time in the object based on the analyzing of the at least one environment data using the third machine learning model. Further, the generating of the command may be based on the predicting.

Figure 9:
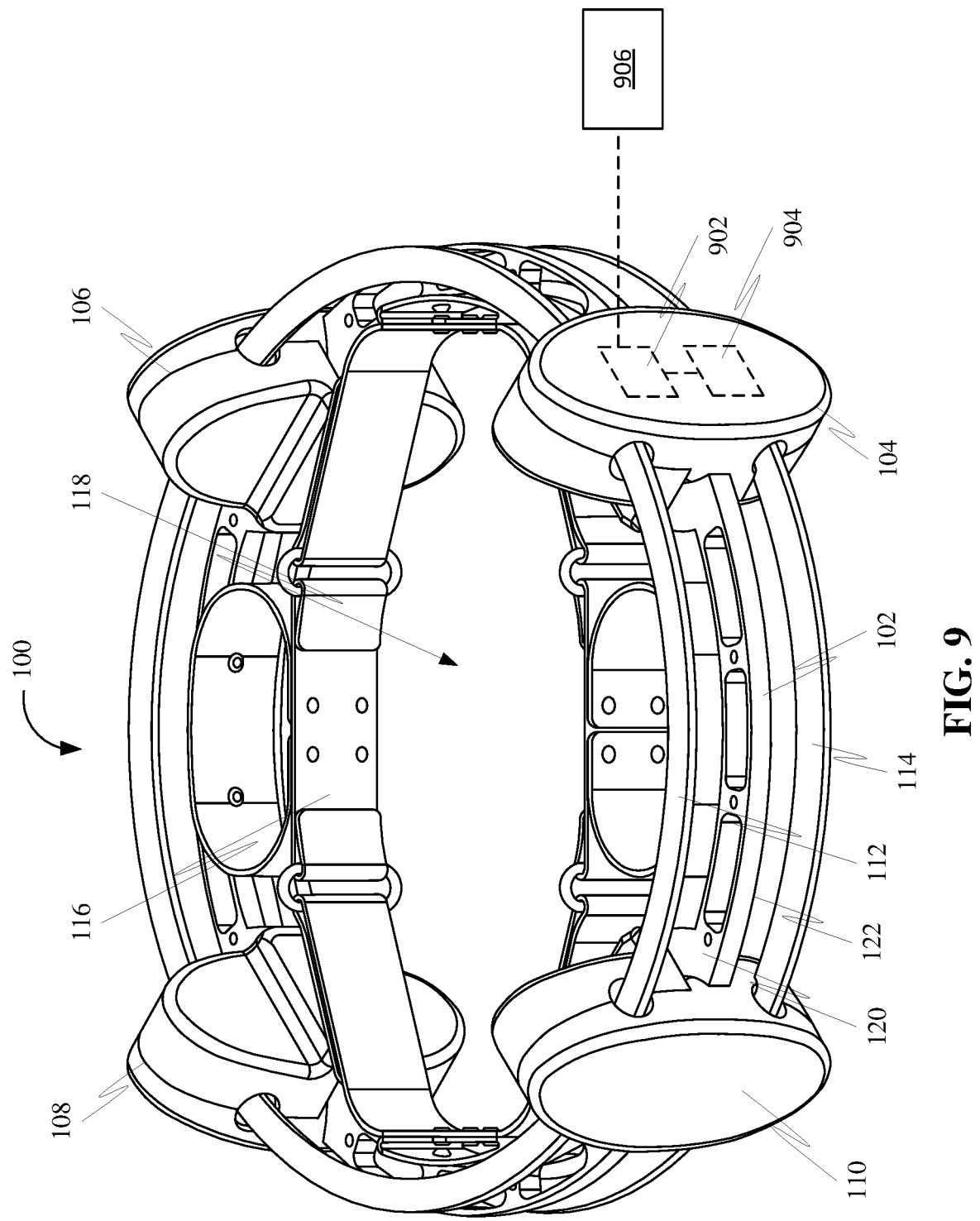
FIG. 9 is a top perspective view of the apparatus, in accordance with some embodiments.

In an embodiment, the apparatus 100 may include a communication device 902 and a processing device 904, as shown in FIG. 9. Further, the communication device 902 and the processing device 904 may be disposed on the assembly housing of the annular body 102. Further, the communication device 902 may be configured for receiving at least one request from at least one user device 906, as shown in FIG. 9. Further, the at least one user device 906 may be a client device, a computing device, etc. Further, the processing device 904 may be communicatively coupled with the communication device 902. Further, the processing device

904 may be configured for analyzing the at least one request. Further, the processing device 904 may be configured for determining the balance level of the balance required by the object from the apparatus 100 based on the analyzing of the at least one request. Further, the processing device 904 may be configured for determining one of the at least one direction and one of the at least one speed for the rotating of the primary sheave 204 based on the determining of the balance level of the balance. Further, the rotating of the primary sheave 204 with one of the at least one speed rotates the two hoops 112-114 with one of the at least one hoop speed for the providing of the balance of the balance level. Further, the processing device 904 may be configured for generating a command for the motor 202 of each of the plurality of drive assemblies 104-110 based on the determining of one of the at least one direction and one of the at least one speed for the rotating of the primary sheave 204. Further, the motor 202 of each of the plurality of drive assemblies 104-110 may be communicatively coupled with the processing device 904. Further, the rotating of the primary sheave 204 may include rotating the primary sheave 204 in one of the at least one direction with one of the at least one speed based on the command.

Figure 10:
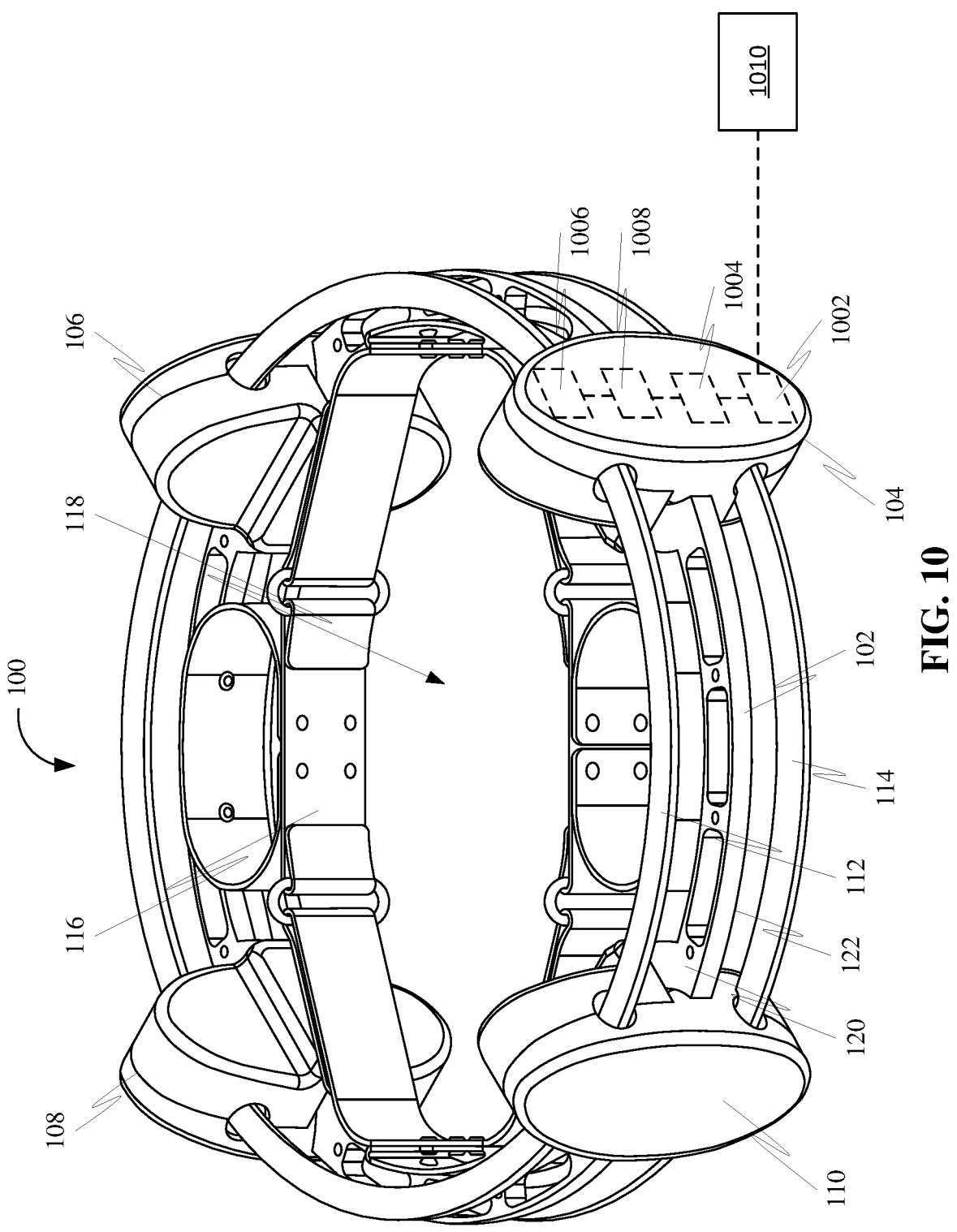
FIG. 10 is a top perspective view of the apparatus, in accordance with some embodiments.

In an embodiment, the apparatus 100 may include a communication device 1002, a storage device 1004, at least one sensor 1006, and a processing device 1008, as shown in FIG. 10. Further, the communication device 1002, the storage device 1004, the at least one sensor 1006, and the processing device 1008 may be disposed on the assembly housing of the annular body 102. Further, the communication device 1002 may be configured for receiving at least one maneuver indication of at least one maneuver to be performed by the object from at least one user device 1010, as shown in FIG. 10. Further, the storage device 1004 may be communicatively coupled with the communication device 1002. Further, the storage device 1004 may be configured for retrieving at least one maneuver model associated with the at least one maneuver based on the at least one maneuver indication. Further, the at least one maneuver model may be a machine learning model. Further, the at least one maneuver model provides balance levels of the balance required by the object in maneuvering instances during performing the at least one maneuver. Further, the at least one sensor 1006 may be configured for generating at least one maneuver data based on detecting at least one maneuvering instance during the at least one maneuver. Further, the at least one maneuvering instance corresponds to an instance of disbalance in the object during the at least one maneuver. Further, the at least one sensor 1006 may include a motion sensor, an accelerometer, an orientation sensor, a camera, etc. Further, the processing device 1008 may be communicatively coupled with the storage device 1004 and the at least one sensor 1006. Further, the processing device 1008 may be configured for analyzing the at least one maneuver data using the at least one maneuver model. Further, the processing device 1008 may be configured for determining the balance level of the balance required for each of the at least one maneuvering instance during the at least one maneuver based on the analyzing of the at least one maneuver data. Further, the processing device 1008 may be configured for determining one of the at least one direction and one of the at least one speed for the rotating of the primary sheave 204 based on the determining of the balance level of the balance. Further, the rotating of the primary sheave 204 with one of the at least one speed rotates the two hoops 112-114 with one of the at least one hoop speed for the providing of the balance of the balance level. Further, the processing device 1008 may be configured for generating a command for the motor 202 of each of the plurality of drive assemblies 104-110 based on the determining of one of the at least one direction and one of the at least one speed for the rotating of the primary sheave 204. Further, the motor 202 of each of the plurality of drive assemblies 104-110 may be communicatively coupled with the processing device 1008. Further, the rotating of the primary sheave 204 may include rotating the primary sheave 204 in one of the at least one direction with one of the at least one speed based on the command. Further, the object may include a body of the user. Further, the at least one maneuver may include at least one activity performed by the user. Further, the at least one activity may include running, jumping, jogging, etc Further, in an embodiment, the storage device 104 may be configured for retrieving at least one historical maneuver data. Further, the at least one historical maneuver data may include at least one historical maneuvering instance at least one historical maneuver performed by the object. Further, the processing device 1008 may be configured for analyzing the at least one historical maneuver data. Further, the processing device 1008 may be configured for identifying the instance of the disbalance of the disbalance level produced in the object during the performing of the at least one historical maneuver corresponding to each of the at least one maneuvering instance based on the analyzing of the at least one historical maneuver data. Further, the processing device 1008 may be configured for training at least one untrained machine learning model with the instance of the disbalance of the disbalance level produced in the object during the performing of the at least one historical maneuver to predict the balance level of the balance required by the object during the performing of the at least one maneuver based on the identifying. Further, the processing device 1008 may be configured for generating the at least one maneuver model based on the training. Further, the storage device 1004 may be configured for storing the at least one maneuver model.

Further, in some embodiments, the harness 116 may be configured for removably attaching the apparatus 100 to the object.

Further, in some embodiments, the harness 116 may include a set of straps for the attaching of the apparatus 100 to the object. Further, the set of straps fastens the apparatus 100 to the object for the attaching of the apparatus 100 to the object.

Figure 12:
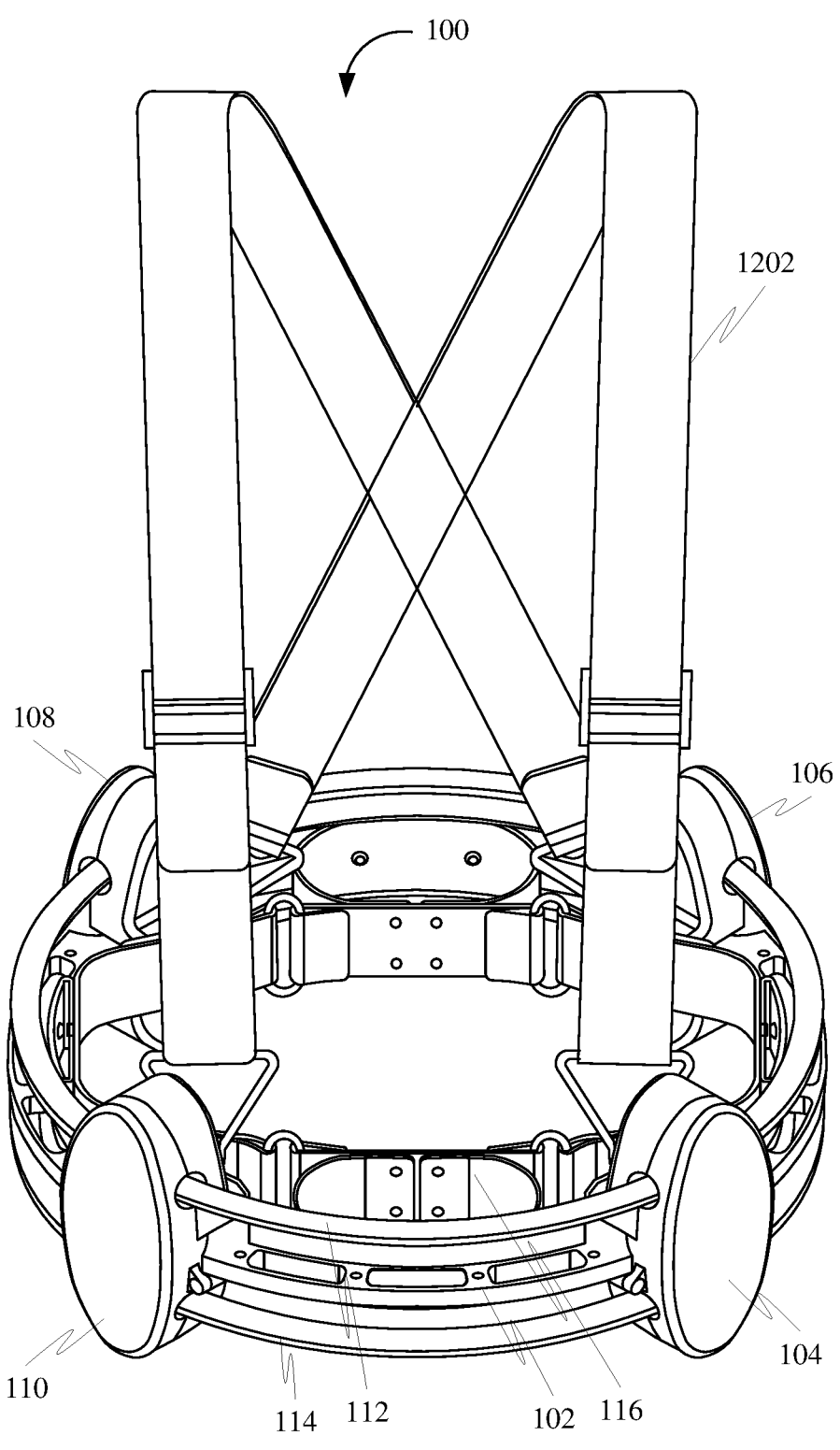
FIG. 12 is a top perspective view of the apparatus with the shoulder harness, in accordance with some embodiments.

Further, in some embodiments, the object may include a body of a user. Further, the apparatus 100 may include a shoulder harness 1202, as shown in FIG. 12, attached to the harness 116. Further, the shoulder harness 1202 may be configured for attaching the apparatus 100 to a shoulder of the body.

Figure 13:
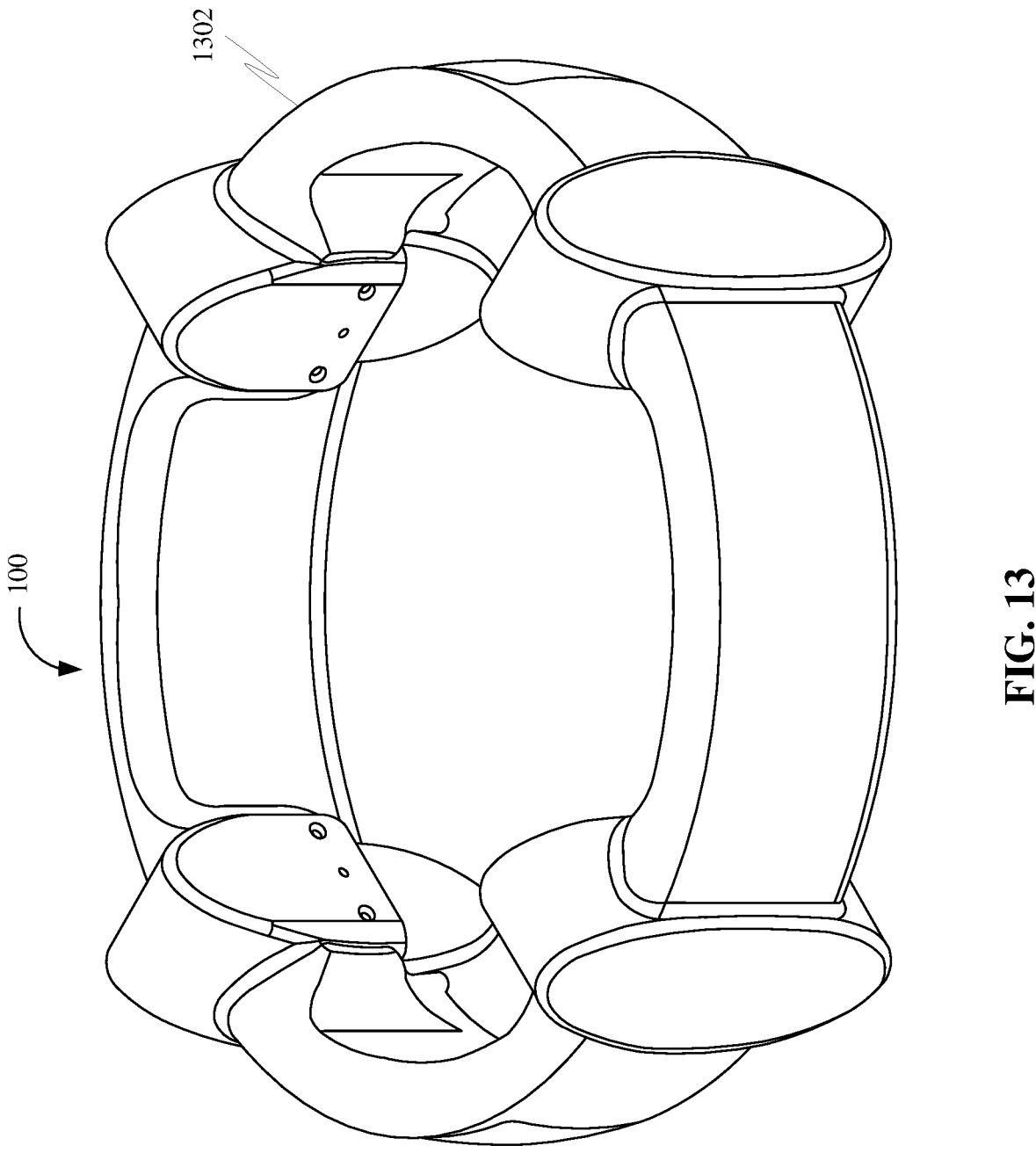
FIG. 13 is a top perspective view of the apparatus with the apparatus housing and without the harness, in accordance with some embodiments.

In further embodiments, the apparatus 100 may include an apparatus housing 1302, as shown in FIG. 13, for housing the annular body 102, the plurality of drive assemblies 104-110, and the two hoops 112-114.

FIG. 2 is a front perspective view of a drive assembly 110 of the plurality of drive assemblies 104-110 of the apparatus 100, in accordance with some embodiments.

Figure 3:
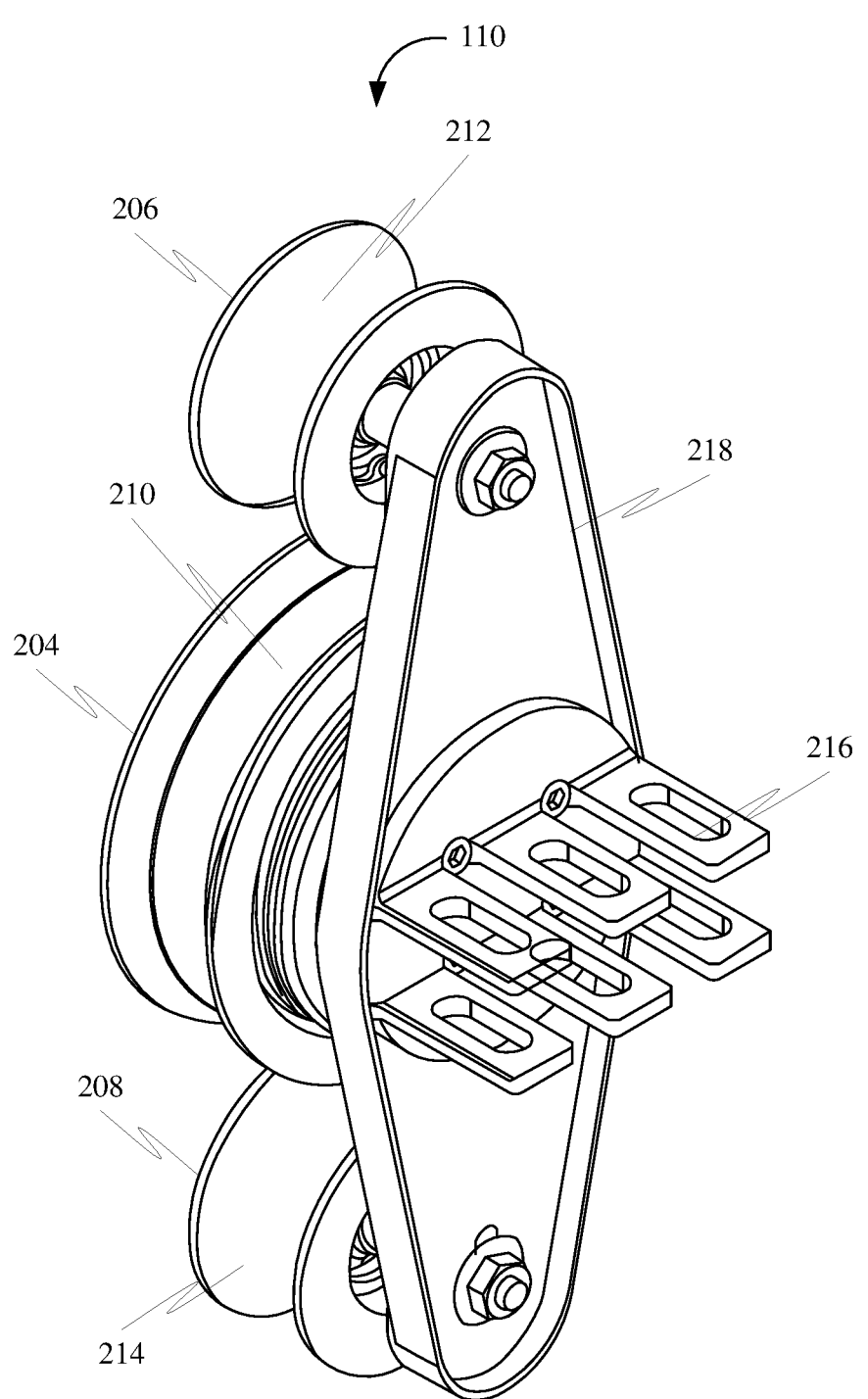
FIG. 3 is a rear perspective view of the drive assembly of the plurality of drive assemblies of the apparatus, in accordance with some embodiments.

FIG. 3 is a rear perspective view of the drive assembly 110 of the plurality of drive assemblies 104-110 of the apparatus 100, in accordance with some embodiments.

Figure 4:
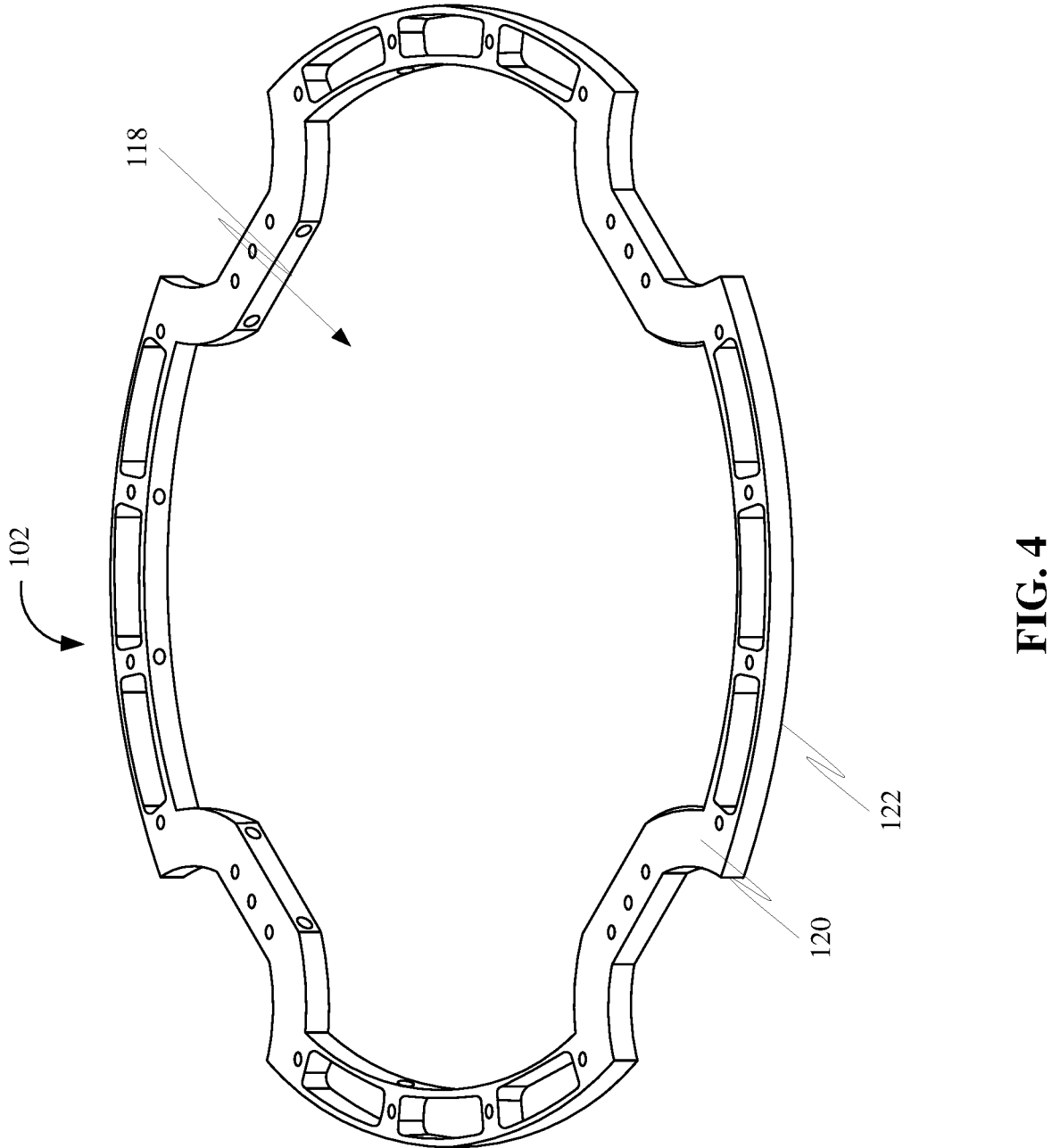
FIG. 4 is a top perspective view of the annular body of the apparatus, in accordance with some embodiments.

FIG. 4 is a top perspective view of the annular body 102 of the apparatus 100, in accordance with some embodiments.

Figure 5:
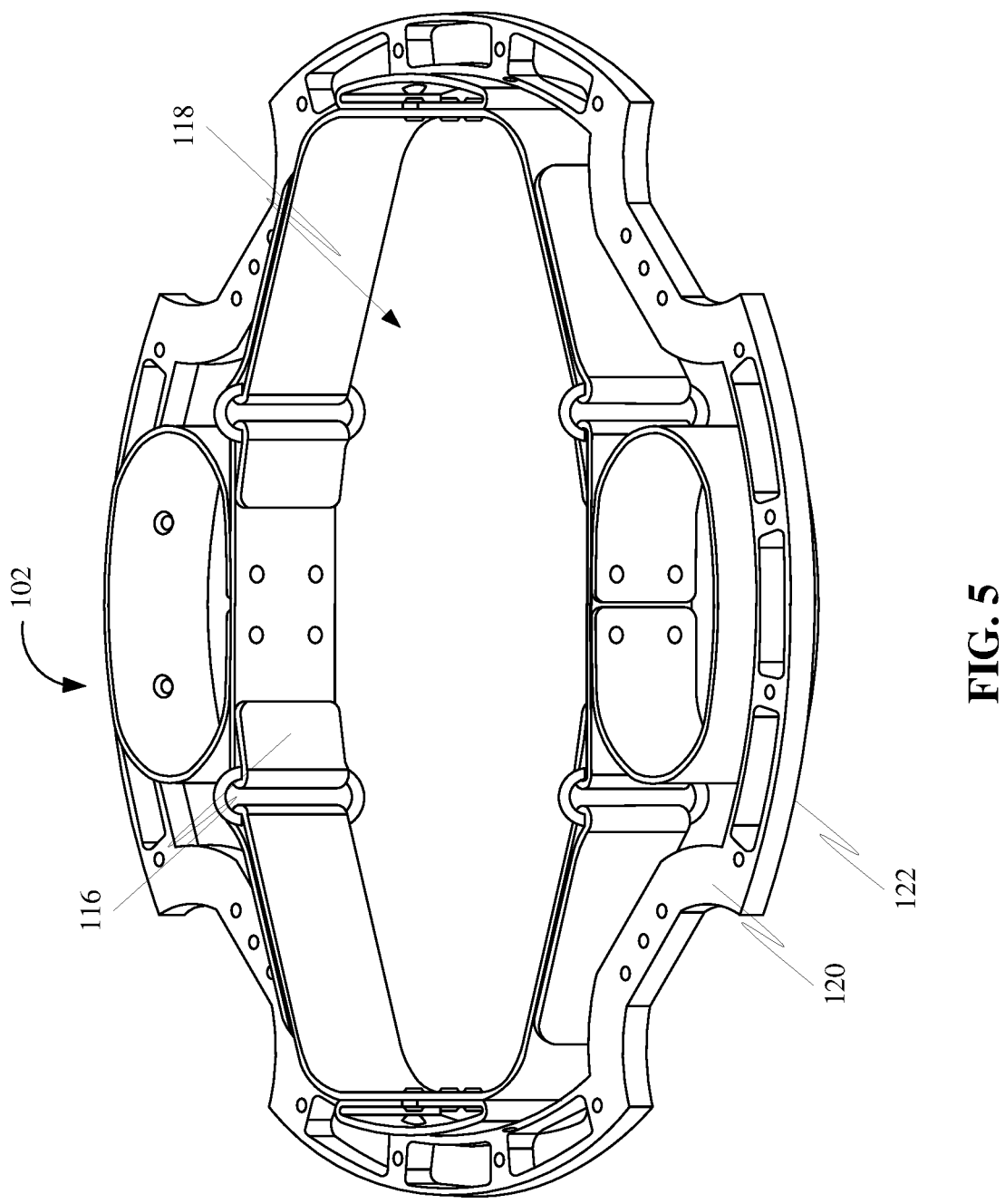
FIG. 5 is a top perspective view of the annular body of the apparatus with the harness, in accordance with some embodiments.

FIG. 5 is a top perspective view of the annular body 102 of the apparatus 100 with the harness 116, in accordance with some embodiments.

FIG. 6 is a top perspective view of the apparatus 100, in accordance with some embodiments.

FIG. 7 is a top perspective view of the apparatus 100, in accordance with some embodiments.

FIG. 8 is a top perspective view of the apparatus 100, in accordance with some embodiments.

FIG. 9 is a top perspective view of the apparatus 100, in accordance with some embodiments.

FIG. 10 is a top perspective view of the apparatus 100, in accordance with some embodiments.

Figure 11:
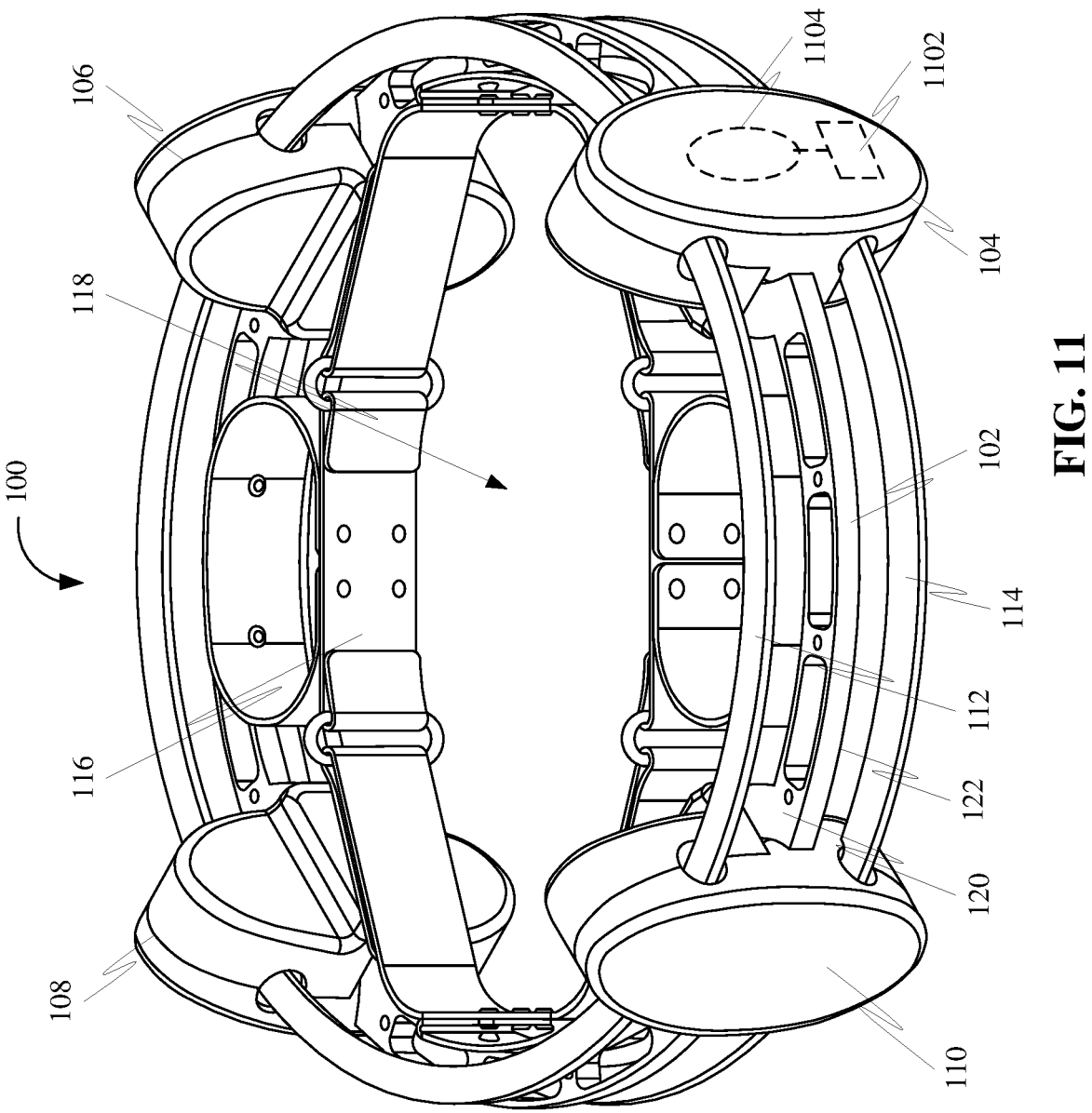
FIG. 11 is a top perspective view of the apparatus, in accordance with some embodiments.

FIG. 11 is a top perspective view of the apparatus 100, in accordance with some embodiments. Further, the apparatus 100 may include a processing device 1102 (such as the processing device 604, the processing device 904, the processing device 1008, etc.) communicatively coupled with a motor 1104 (such as the motor 202) associated with a drive assembly 104 of the plurality of drive assemblies 104-110. Further, the processing device 1102 may be configured for controlling at least one operation of the motor 1104. Further, the at least one operation may include the rotating of a primary sheave (such as the primary sheave 204) associated with the motor 1104 in one of the at least one direction with one of the at least one speed based on a command. Further, the motor 1104 may be configured for performing the at least one operation based on the command.

FIG. 12 is a top perspective view of the apparatus 100 with the shoulder harness 1202, in accordance with some embodiments.

FIG. 13 is a top perspective view of the apparatus 100 with the apparatus housing 1302 and without the harness 116, in accordance with some embodiments.

Figure 14:
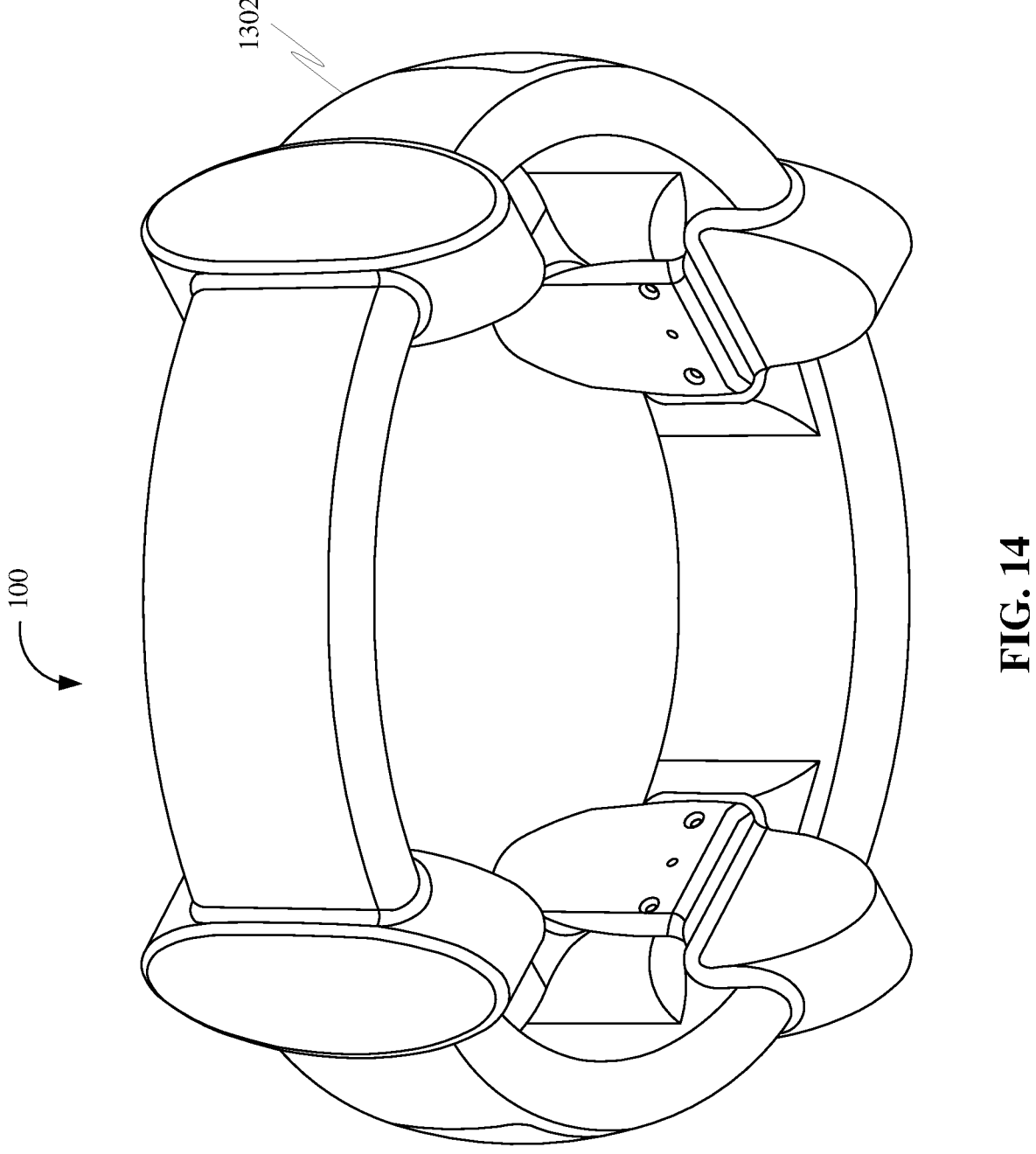
FIG. 14 is a bottom perspective view of the apparatus with the apparatus housing and without the harness, in accordance with some embodiments.

FIG. 14 is a bottom perspective view of the apparatus 100 with the apparatus housing 1302 and without the harness 116, in accordance with some embodiments.

Figure 15:
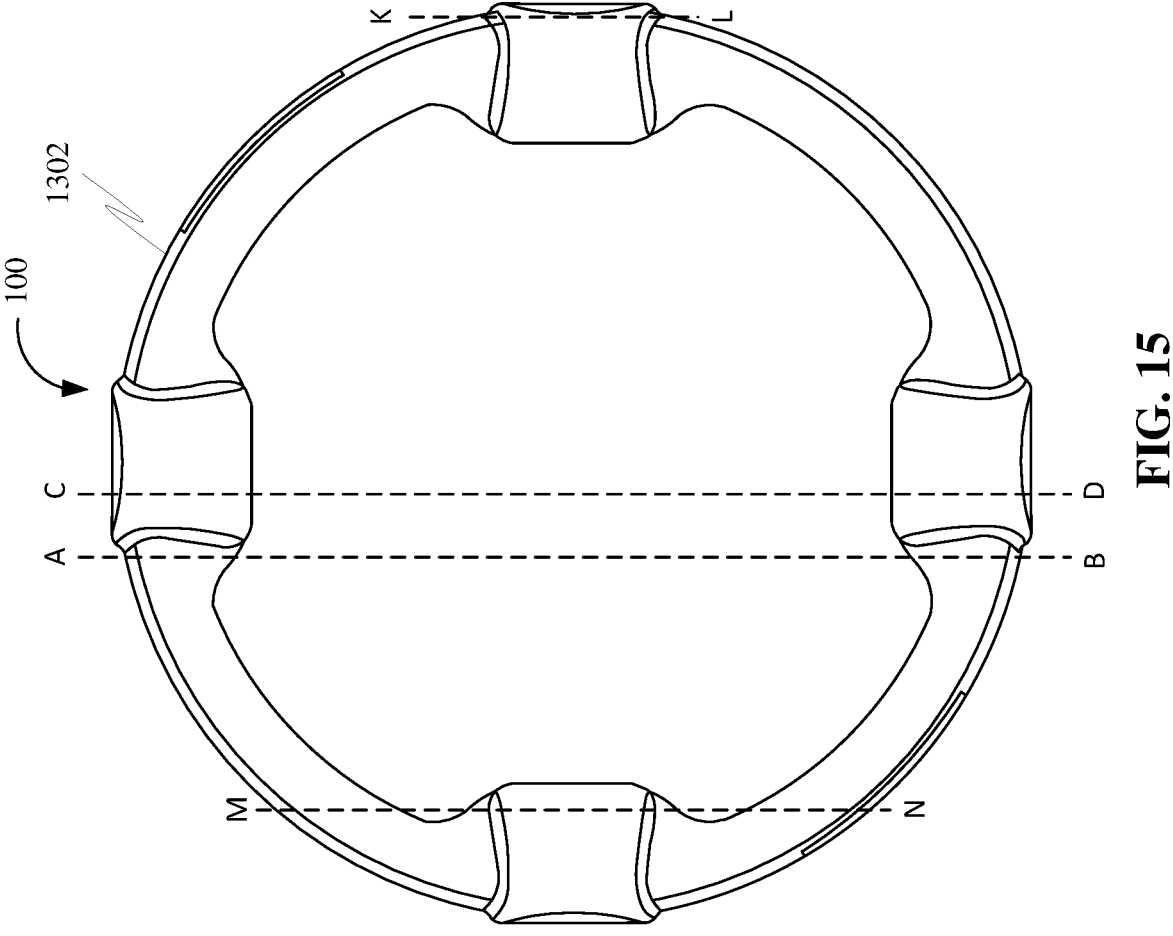
FIG. 15 is a top view of the apparatus with the apparatus housing and without the harness, in accordance with some embodiments.

FIG. 15 is a top view of the apparatus 100 with the apparatus housing 1302 and without the harness 116, in accordance with some embodiments.

Figure 16:
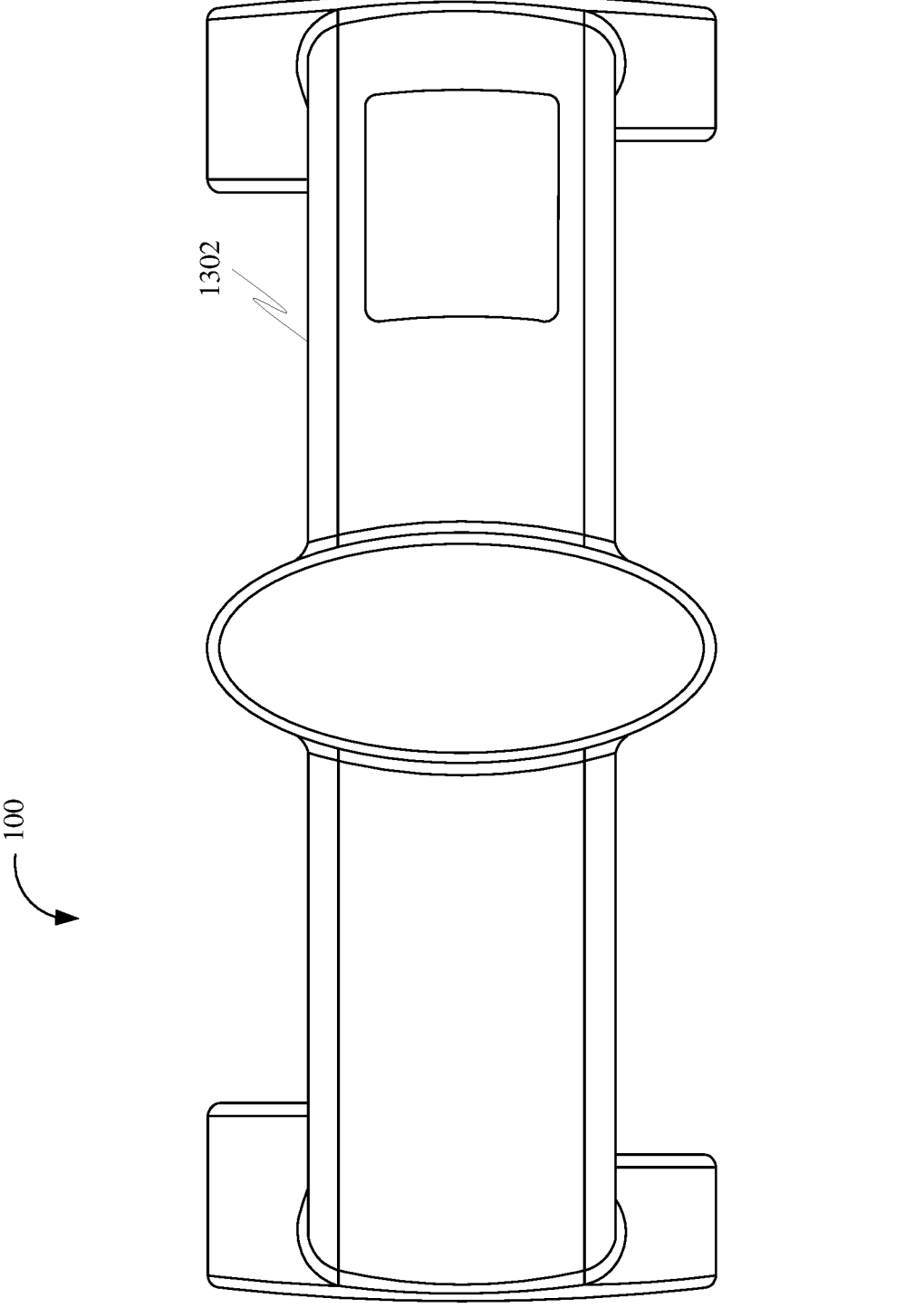
FIG. 16 is a left side view of the apparatus with the apparatus housing and without the harness, in accordance with some embodiments.

FIG. 16 is a left side view of the apparatus 100 with the apparatus housing 1302 and without the harness 116, in accordance with some embodiments.

Figure 17:
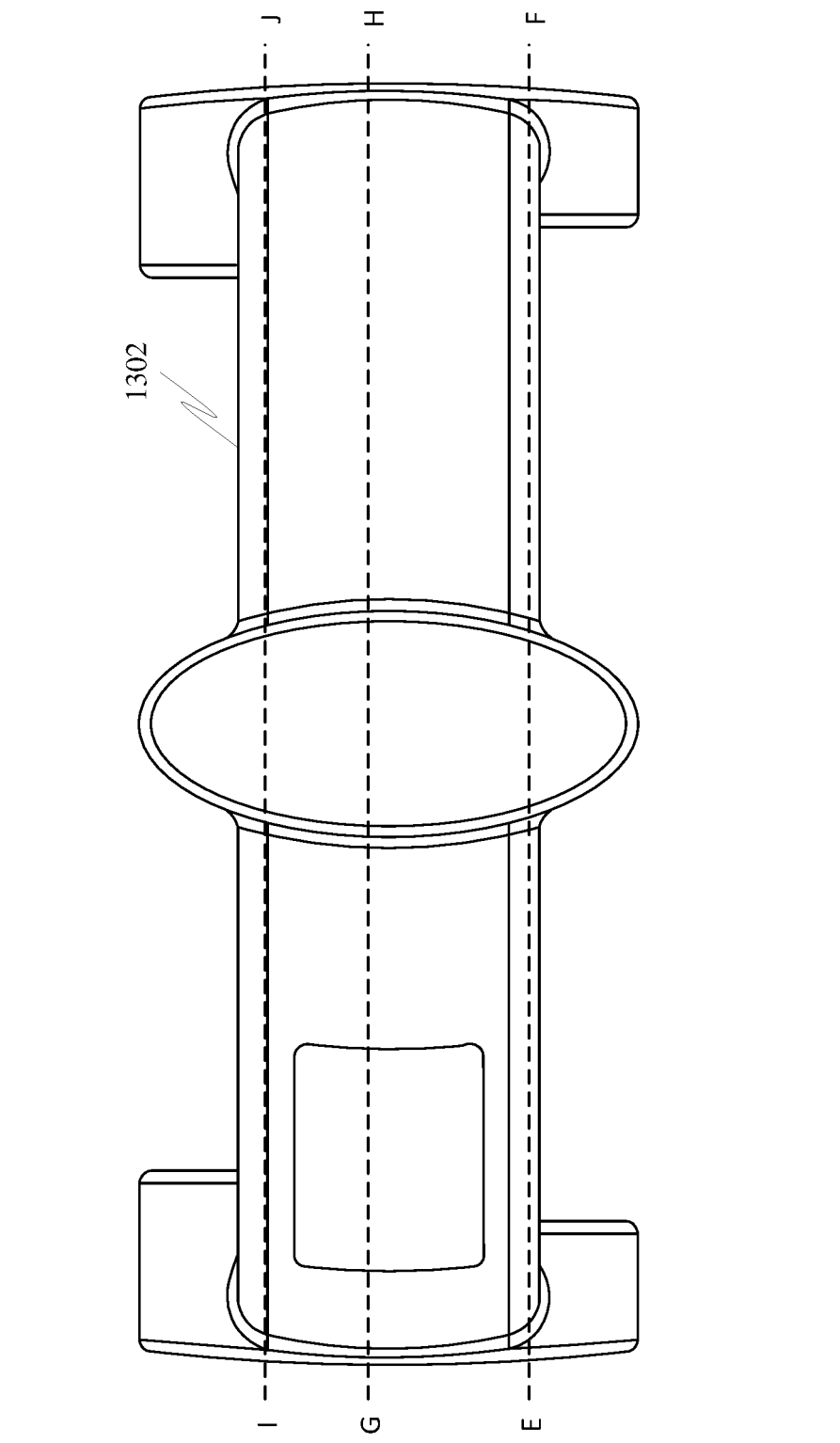
FIG. 17 is a front view of the apparatus with the apparatus housing and without the harness, in accordance with some embodiments.

FIG. 17 is a front view of the apparatus 100 with the apparatus housing 1302 and without the harness 116, in accordance with some embodiments.

Figure 18:
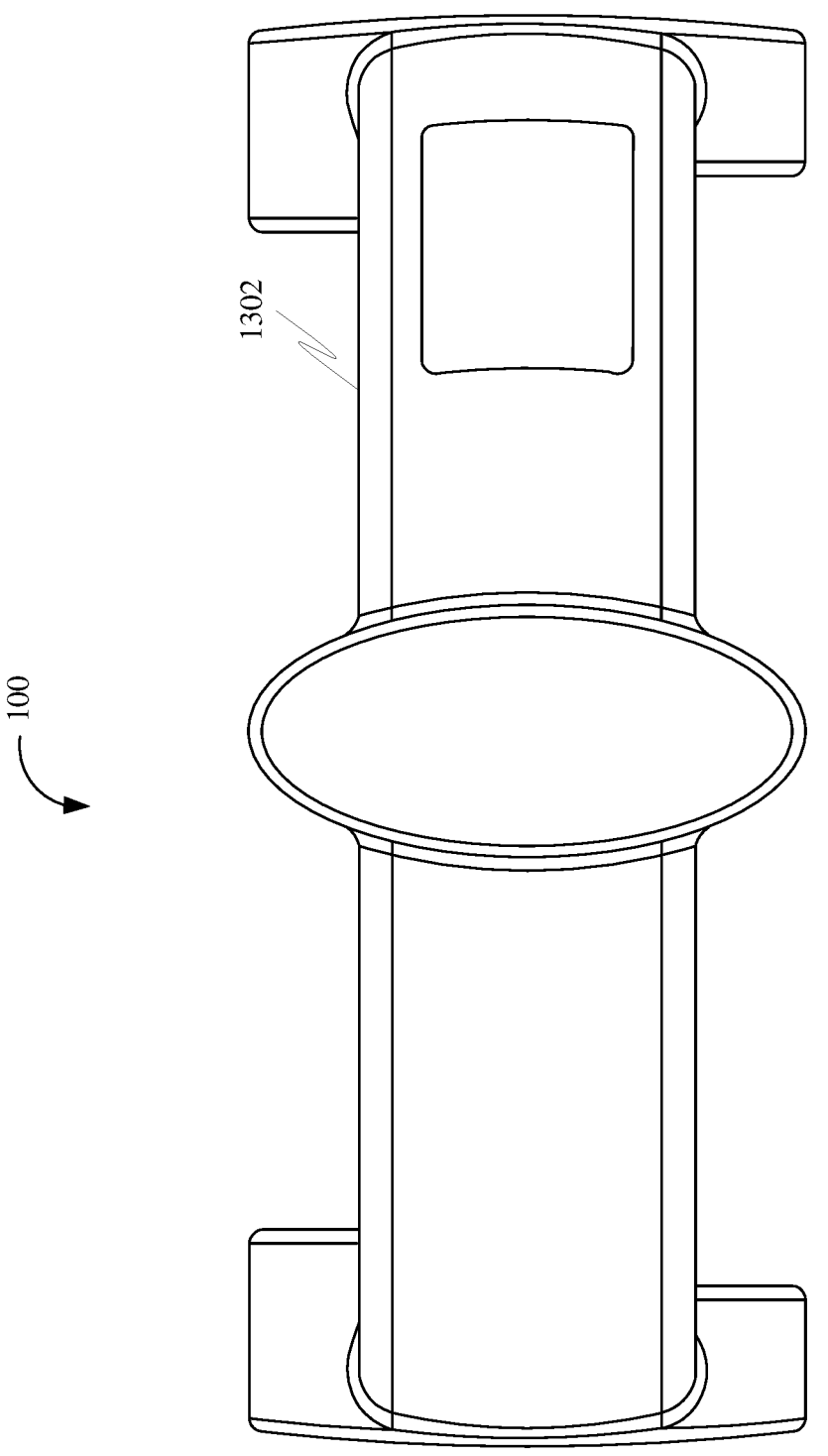
FIG. 18 is a right side view of the apparatus with the apparatus housing and without the harness, in accordance with some embodiments.

FIG. 18 is a right side view of the apparatus 100 with the apparatus housing 1302 and without the harness 116, in accordance with some embodiments.

Figure 19:
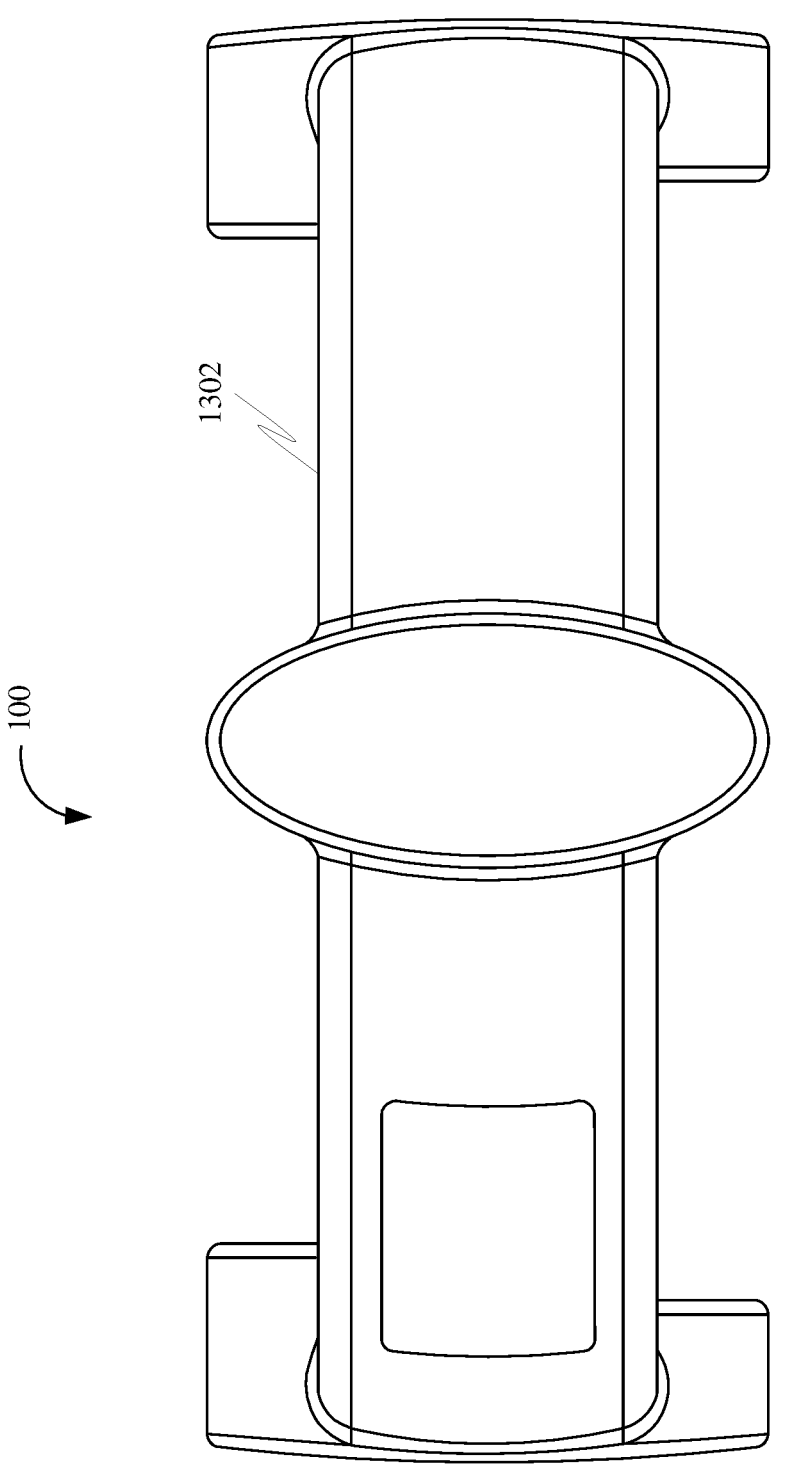
FIG. 19 is a rear view of the apparatus with the apparatus housing and without the harness, in accordance with some embodiments.

FIG. 19 is a rear view of the apparatus 100 with the apparatus housing 1302 and without the harness 116, in accordance with some embodiments.

Figure 20:
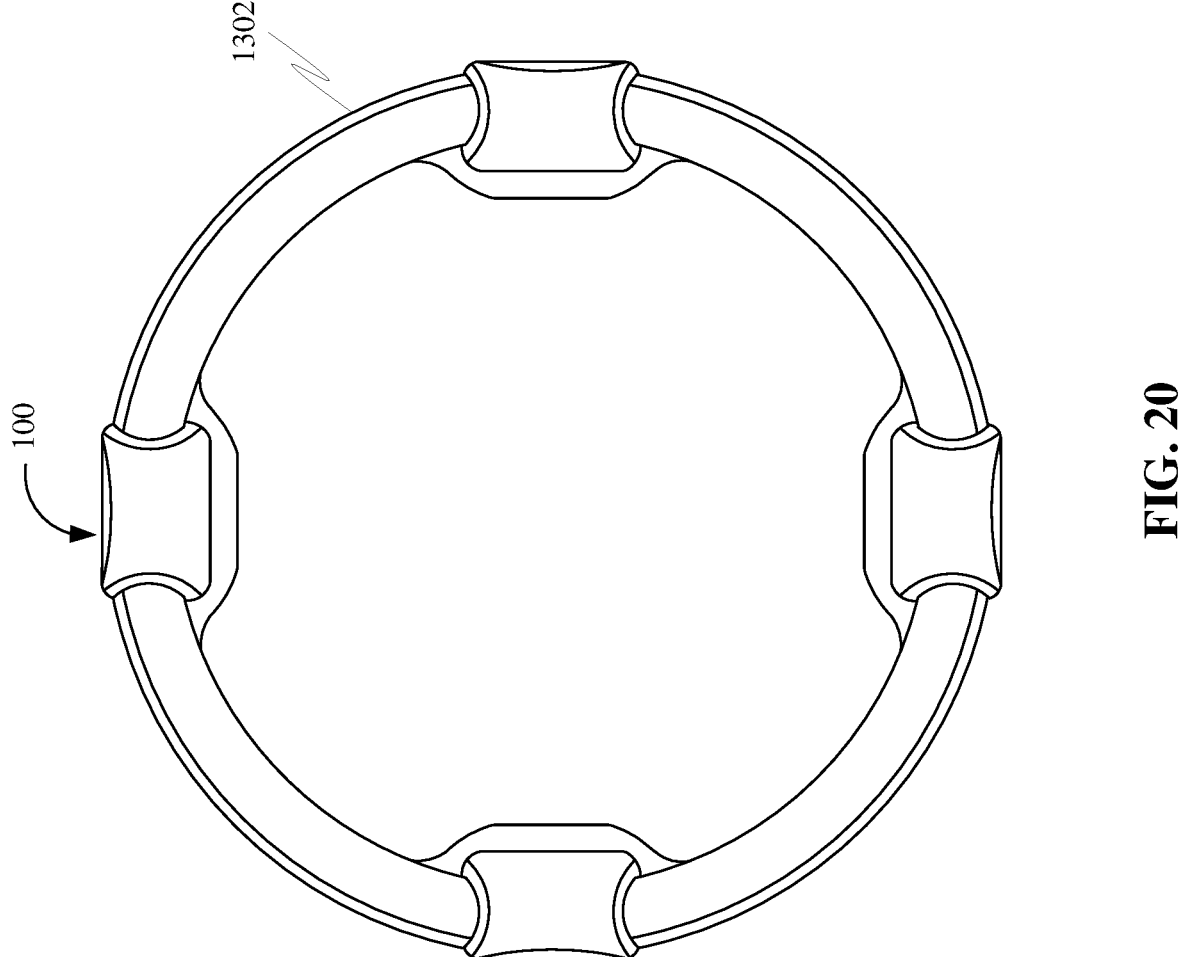
FIG. 20 is a bottom view of the apparatus with the apparatus housing and without the harness, in accordance with some embodiments.

FIG. 20 is a bottom view of the apparatus 100 with the apparatus housing 1302 and without the harness 116, in accordance with some embodiments.

Figure 21:
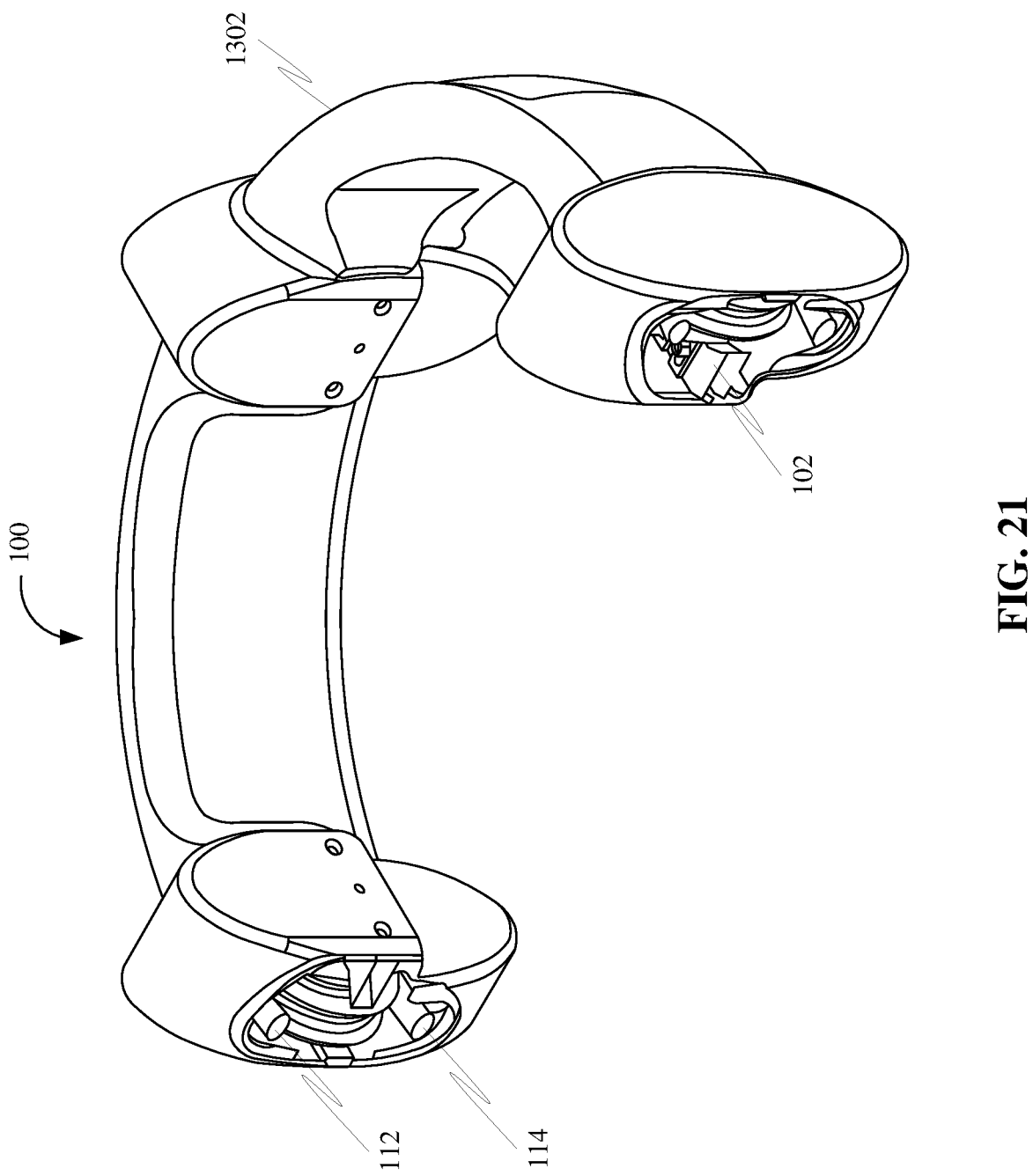
FIG. 21 is a top perspective cross sectional view of FIG. 15 along line A-B, in accordance with some embodiments.

FIG. 21 is a top perspective cross sectional view of FIG. 15 along line A-B, in accordance with some embodiments.

Figure 22:
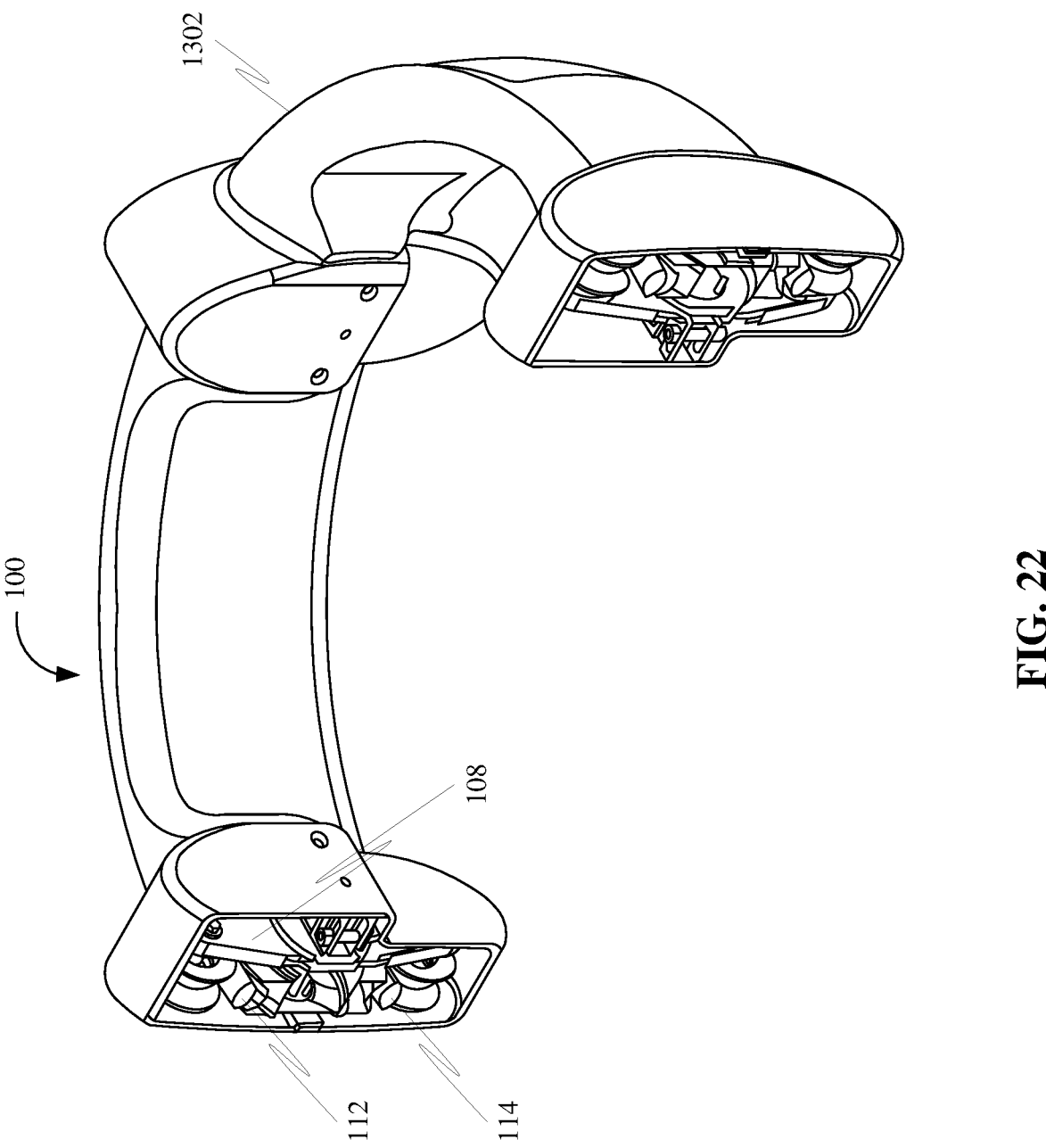
FIG. 22 is a top perspective cross sectional view of FIG. 15 along line C-D, in accordance with some embodiments.

FIG. 22 is a top perspective cross sectional view of FIG. 15 along line C-D, in accordance with some embodiments.

Figure 23:
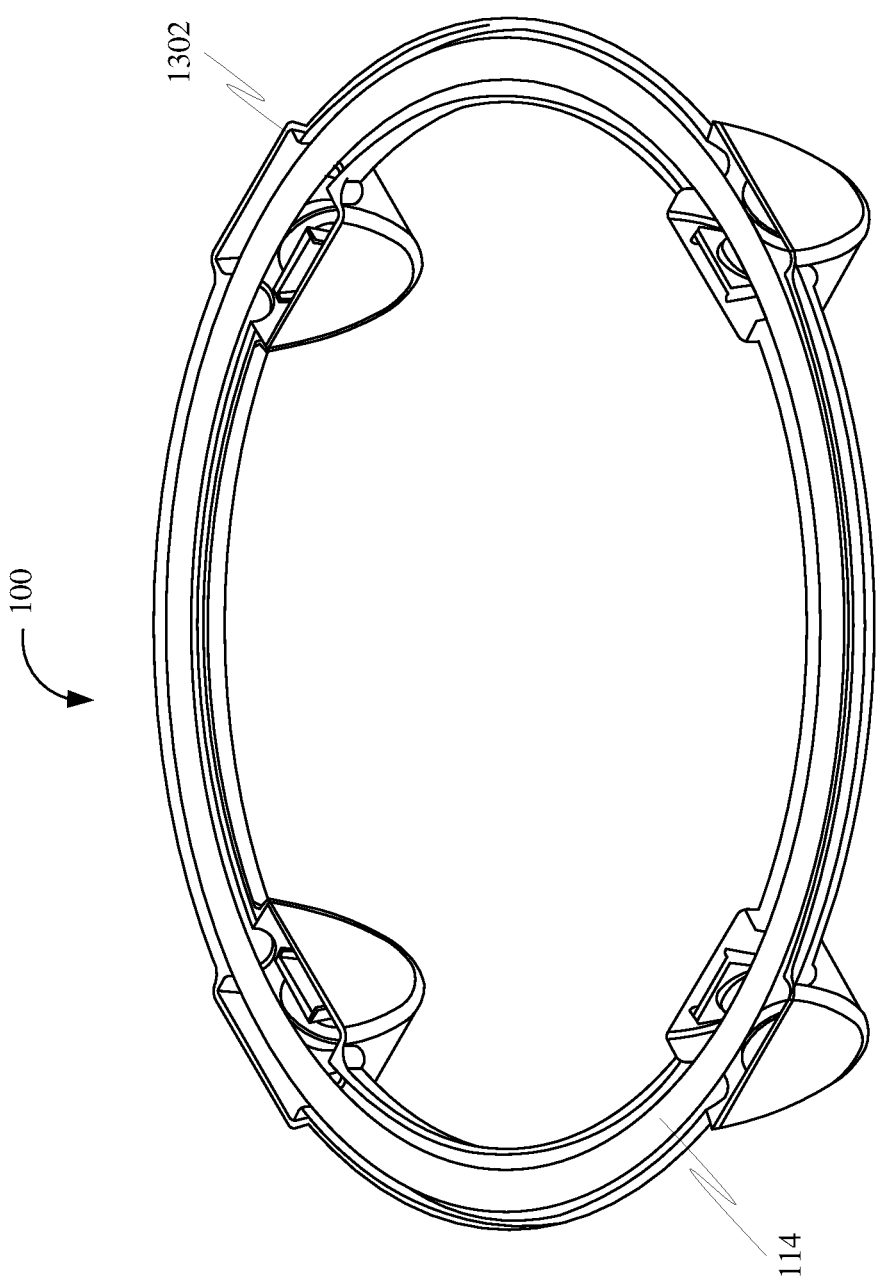
FIG. 23 is a top perspective cross sectional view of FIG. 17 along line E-F, in accordance with some embodiments.

FIG. 23 is a top perspective cross sectional view of FIG. 17 along line E-F, in accordance with some embodiments.

Figure 24:
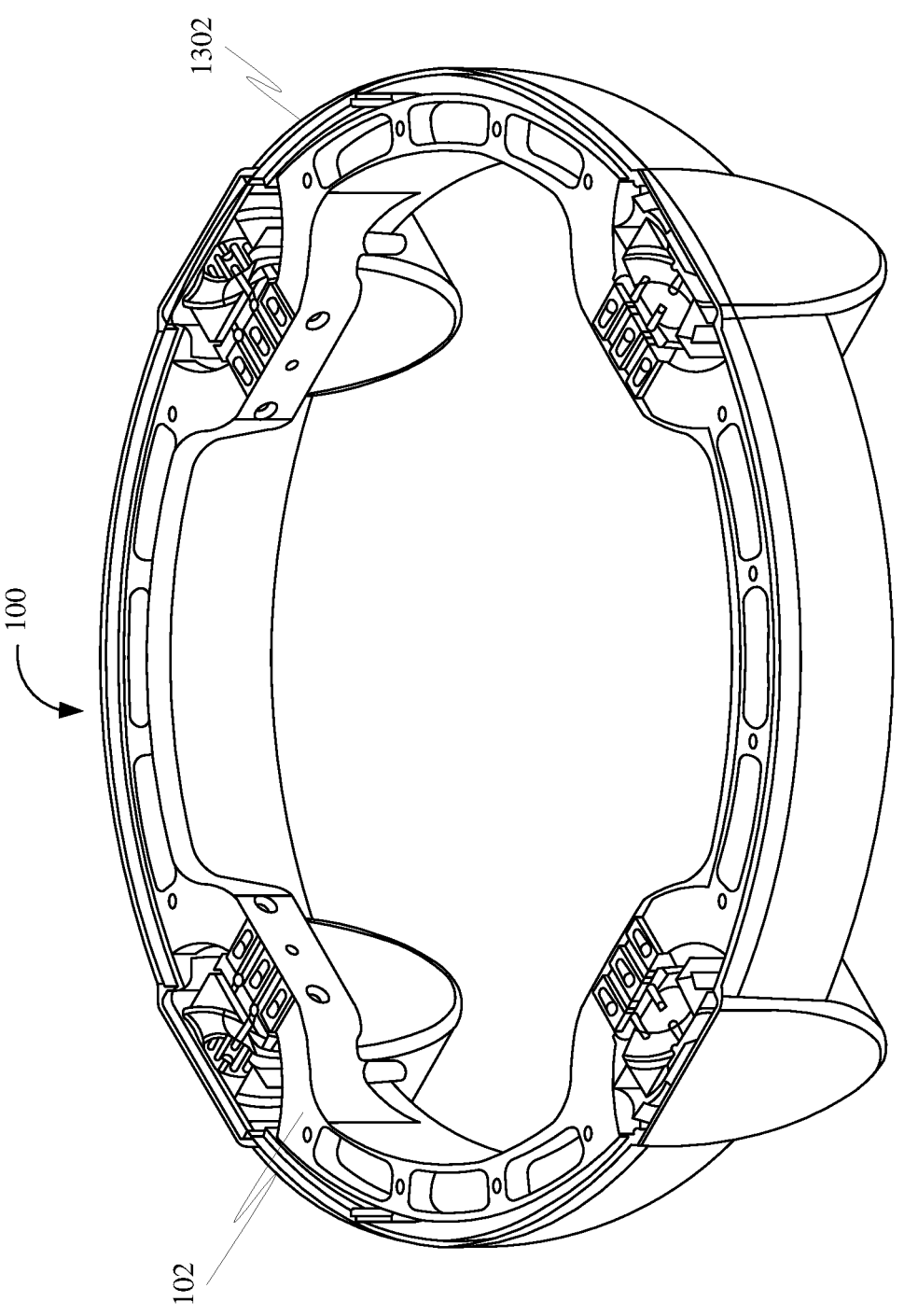
FIG. 24 is a top perspective cross sectional view of FIG. 17 along line G-H, in accordance with some embodiments.

FIG. 24 is a top perspective cross sectional view of FIG. 17 along line G-H, in accordance with some embodiments.

Figure 25:
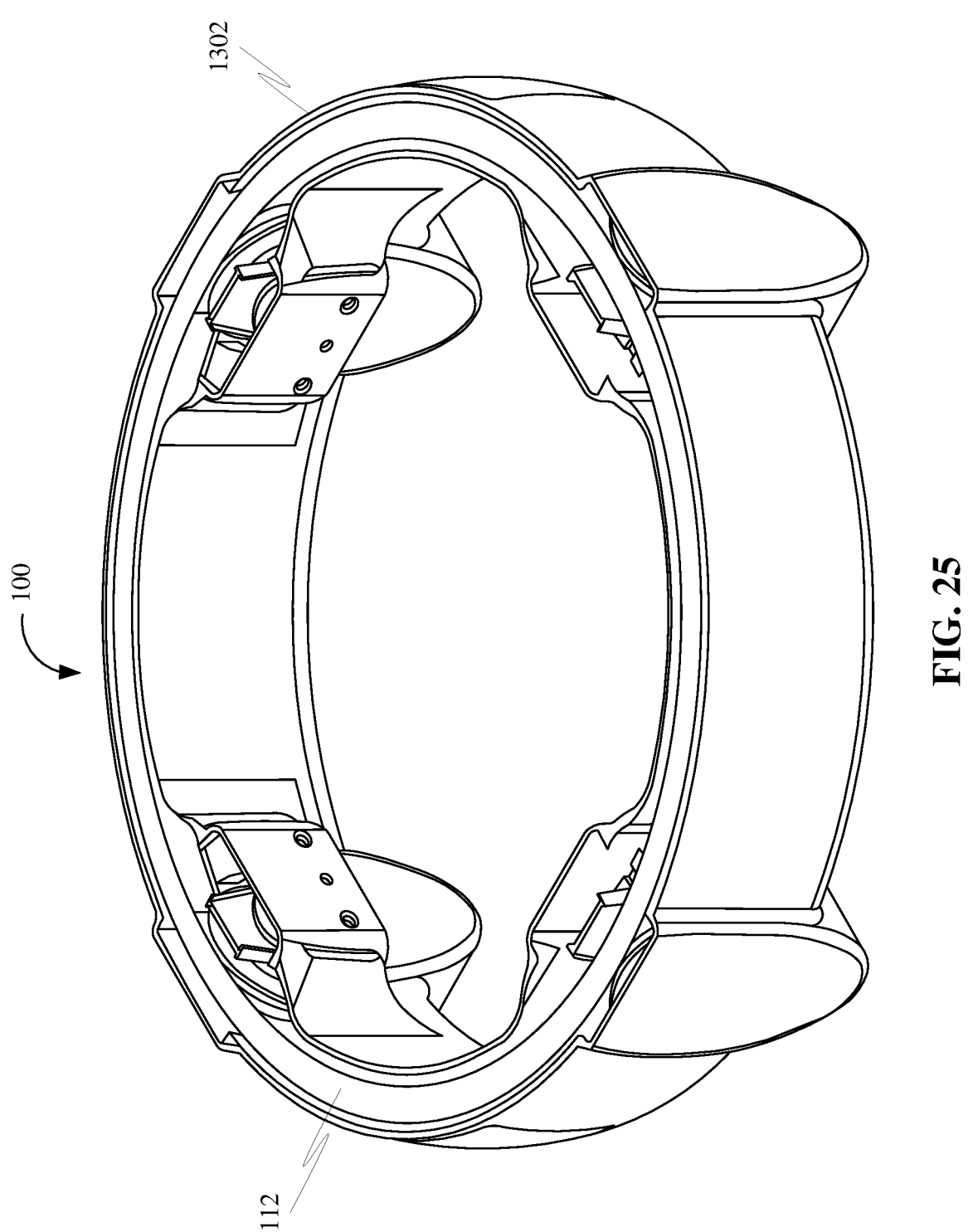
FIG. 25 is a top perspective cross sectional view of FIG. 17 along line I-J, in accordance with some embodiments.

FIG. 25 is a top perspective cross sectional view of FIG. 17 along line I-J, in accordance with some embodiments.

Figure 26:
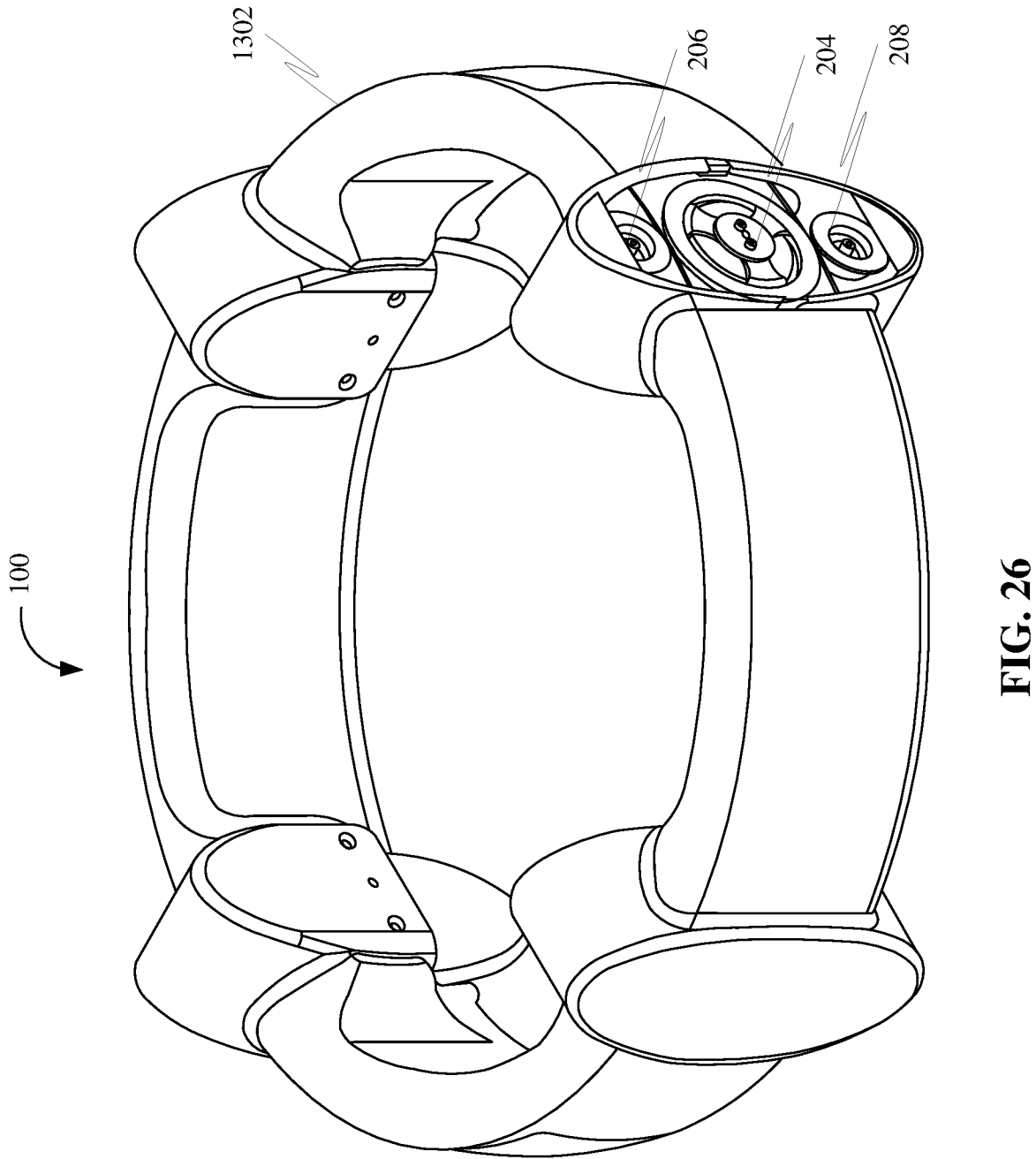
FIG. 26 is a top perspective cross sectional view of FIG. 15 along line K-L, in accordance with some embodiments.

FIG. 26 is a top perspective cross sectional view of FIG. 15 along line K-L, in accordance with some embodiments.

Figure 27:
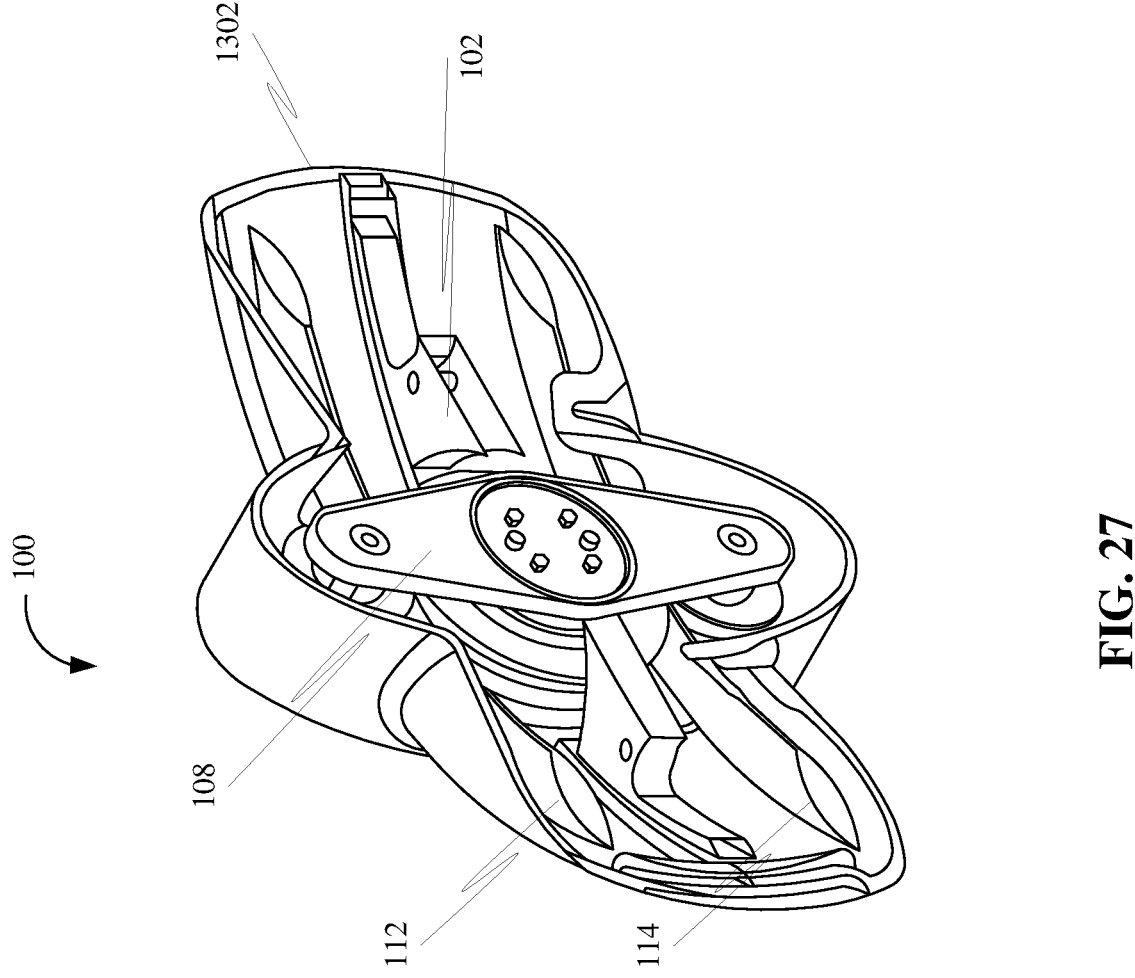
FIG. 27 is a top perspective cross sectional view of FIG. 15 along line M-N, in accordance with some embodiments.

FIG. 27 is a top perspective cross sectional view of FIG. 15 along line M-N, in accordance with some embodiments.

Figure 28:
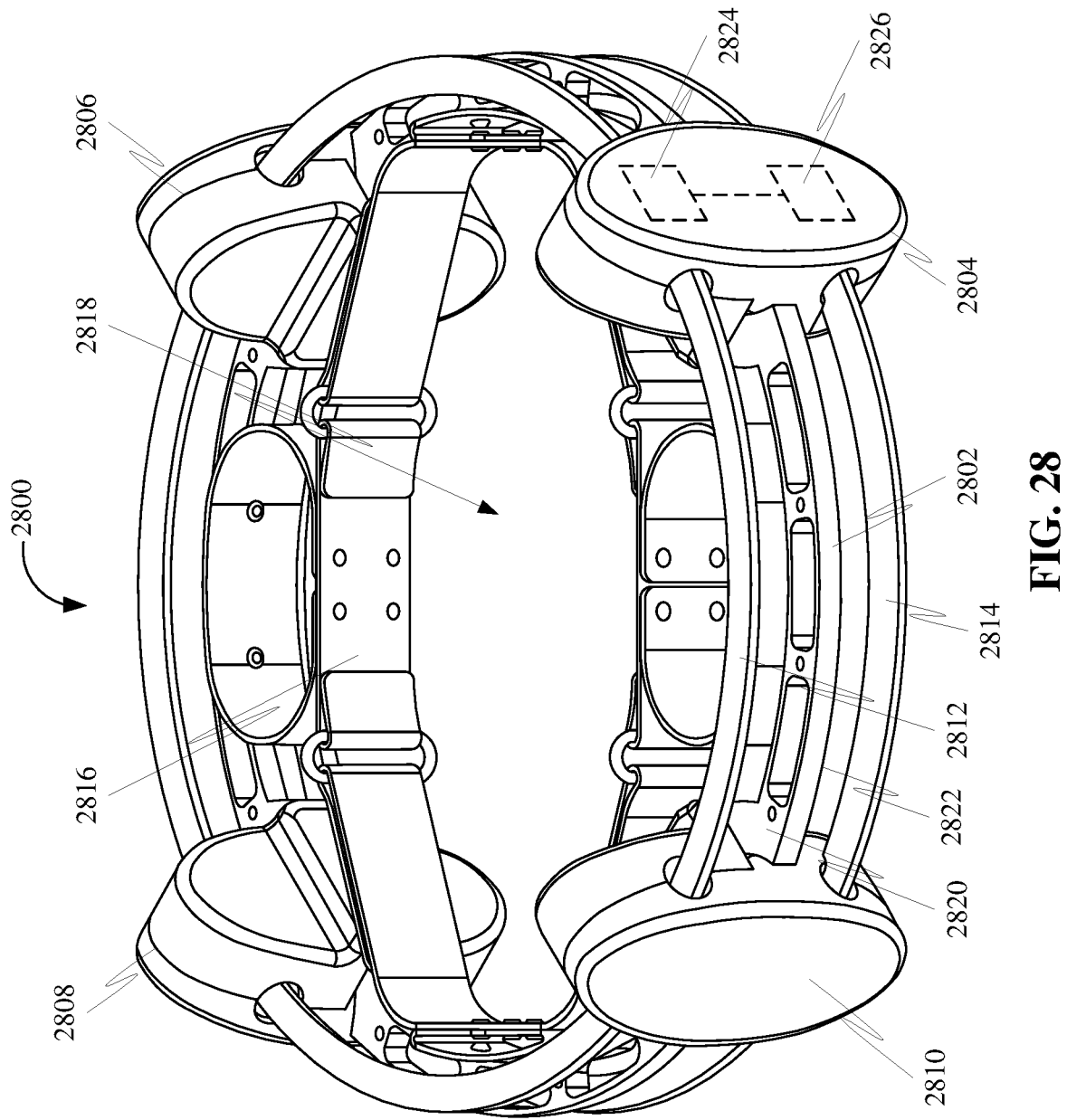
FIG. 28 is a top perspective of an apparatus for providing a balance to objects attached to the apparatus, in accordance with some embodiments.

FIG. 28 is a top perspective of an apparatus 2800 for providing a balance to objects attached to the apparatus 2800, in accordance with some embodiments. Accordingly, the apparatus 2800 may include an annular body 2802, a plurality of drive assemblies 2804-2810, two hoops 2812-2814, a harness 2816, at least one motion sensor 2824, and a processing device 2826.

Further, the annular body 2802 may include a central cavity 2818 about a central axis of the annular body 2802. Further, the annular body 2802 may be configured for receiving an object in the central cavity 2818 for placing the annular body 2802 around the object.

Further, the plurality of drive assemblies 2804-2810 may be mounted to the annular body 2802. Further, each of the plurality of drive assemblies 2804-2810 may include a motor, a primary sheave, and two secondary sheaves. Further, the primary sheave may be radially and rotatably disposed on the annular body 2802, a first secondary sheave of the two secondary sheaves may be rotatably disposed on a top side 2820 of the annular body 2802 above the primary sheave, and a second secondary sheave of the two secondary sheaves may be rotatably disposed on a bottom side 2822 opposite to the top side 2820 of the annular body 2802 below the primary sheave based on the mounting of each of the plurality of drive assemblies 2804-2810 on the annular body 2802. Further, the primary sheave and the two secondary sheaves may be coplanar. Further, the motor may be mechanically coupled with the primary sheave. Further, the motor may be configured for rotating the primary sheave about a sheave axis perpendicular to the central axis in at least one direction with at least one speed.

Further, the two hoops 2812-2814 may include a first hoop 2812 and a second hoop 2814. Further, the first hoop 2812 may be coaxially disposed on the top side 2820 and rotatably supported between a primary groove surface of the primary sheave and a first secondary groove surface of the first secondary sheave. Further, the second hoop 2814 may be coaxially disposed on the bottom side 2822 and rotatably supported between the primary groove surface and a second secondary groove surface of the second secondary sheave. Further, the rotating of the primary sheave rotates the first hoop 2812 in a first direction with at least one hoop speed about the central axis and the second hoop 2814 in a second direction opposite to the first direction with the at least one hoop speed about the central axis for generating the balance.

Further, the harness 2816 may be configured for attaching the apparatus 2800 to the object after the receiving of the object in the central cavity 2818. Further, the attaching of the apparatus 2800 to the object provides the balance to the object based on the generating. Further, the balance may be associated with a balance level corresponding to each of the at least one hoop speed of the two hoops 2812-2814. Further, the balance level of the balance prevents an instance of a disbalance associated with a disbalance level smaller than the balance level in the object.

Further, the at least one motion sensor 2824 may be configured for generating at least one motion data based on detecting a movement associated with the object.

Further, the processing device 2826 may be communicatively coupled with the at least one motion sensor 2824. Further, the processing device 2826 may be configured for analyzing the at least one motion data. Further, the processing device 2826 may be configured for determining the instance of the disbalance in the object based on the analyzing. Further, the processing device 2826 may be configured for generating a command for the motor of each of the plurality of drive assemblies 2804-2810 based on the determining. Further, the motor of each of the plurality of drive assemblies 2804-2810 may be communicatively coupled with the processing device 2826. Further, the rotating of the primary sheave may be based on the command. Further, in an embodiment, the annular body 2802 comprises an assembly housing for each of the plurality of drive assemblies 2804-2810 for housing each of the plurality of drive assemblies 2804-2810. Further, the at least one motion sensor 2824 and the processing device 2826 may be disposed on the assembly housing.

Further, in some embodiments, the determining of the instance of the disbalance may include determining the disbalance level of the instance of the disbalance in the object based on the analyzing. Further, the processing device 2826 may be configured for determining the balance level of the balance required by the object based on the disbalance level of the instance of the disbalance in the object. Further, the processing device 2826 may be configured for determining one of the at least one direction and one of the at least one speed for the rotating of the primary sheave based on the determining of the balance level of the balance. Further, the rotating of the primary sheave with one of the at least one speed rotates the two hoops 2812-2814 with one of the at least one hoop speed for the generating of the balance of the balance level. Further, the generating of the command may be based on the determining of one of the at least one direction and one of the at least one speed. Further, the rotating of the primary sheave may include rotating the primary sheave in one of the at least one direction with one of the at least one speed based on the command. Further, in an embodiment, the analyzing of the at least one motion data may include analyzing the at least one motion data using a first machine learning model. Further, the first machine learning model may be trained for detecting instances of disbalance in the object happening in future times based on movements of the object. Further, the determining of the instance of the disbalance may include predicting the instance of the disbalance happening in a future time in the object based on the analyzing of the at least one motion data using the first machine learning model. Further, the generating of the command may be based on the predicting.

Further, in some embodiments, the object may include a body of a user. Further, the apparatus 2800 may include at least one biometric sensor communicatively coupled with the processing device 2826. Further, the at least one biometric sensor may be configured for generating at least one biometric data based on detecting a physiological state of the user. Further, the processing device 2826 may be configured for analyzing the at least one biometric data. Further, the determining of the instance of the disbalance in the object comprising the body may be based on the analyzing of the at least one biometric data. Further, in an embodiment, the analyzing of the at least one biometric data may include analyzing the at least one biometric data using a second machine learning model. Further, the second machine learning model may be trained for detecting instances of the disbalance in the object comprising the body happening in future times based on physiological states of the user. Further, the determining of the instance of the disbalance in the object comprising the body may include predicting the instance of the disbalance happening in a future time in the body based on the analyzing of the at least one biometric data using the second machine learning model. Further, the generating of the command may be based on the predicting.

In some embodiments, the apparatus 2800 may include at least one environment sensor communicatively coupled with the processing device 2826. Further, the at least one environment sensor may be configured for generating at least one environment data based on detecting a presence of an environmental factor in an environment of the object. Further, the processing device 2826 may be configured for analyzing the at least one environment data. Further, the determining of the instance of the disbalance in the object may be based on the analyzing of the at least one environment data. Further, in embodiment, the analyzing of the at least one environment data may include analyzing the at least one environment data using a third machine learning model. Further, the third machine learning model may be trained for detecting instances of disbalance in the object happening in future times based on influences of environmental factors on the object. Further, the determining of the instance of the disbalance in the object may include predicting the instance of the disbalance happening in a future time in the object based on the analyzing of the at least one environment data using the third machine learning model. Further, the generating of the command may be based on the predicting.

Figure 29:
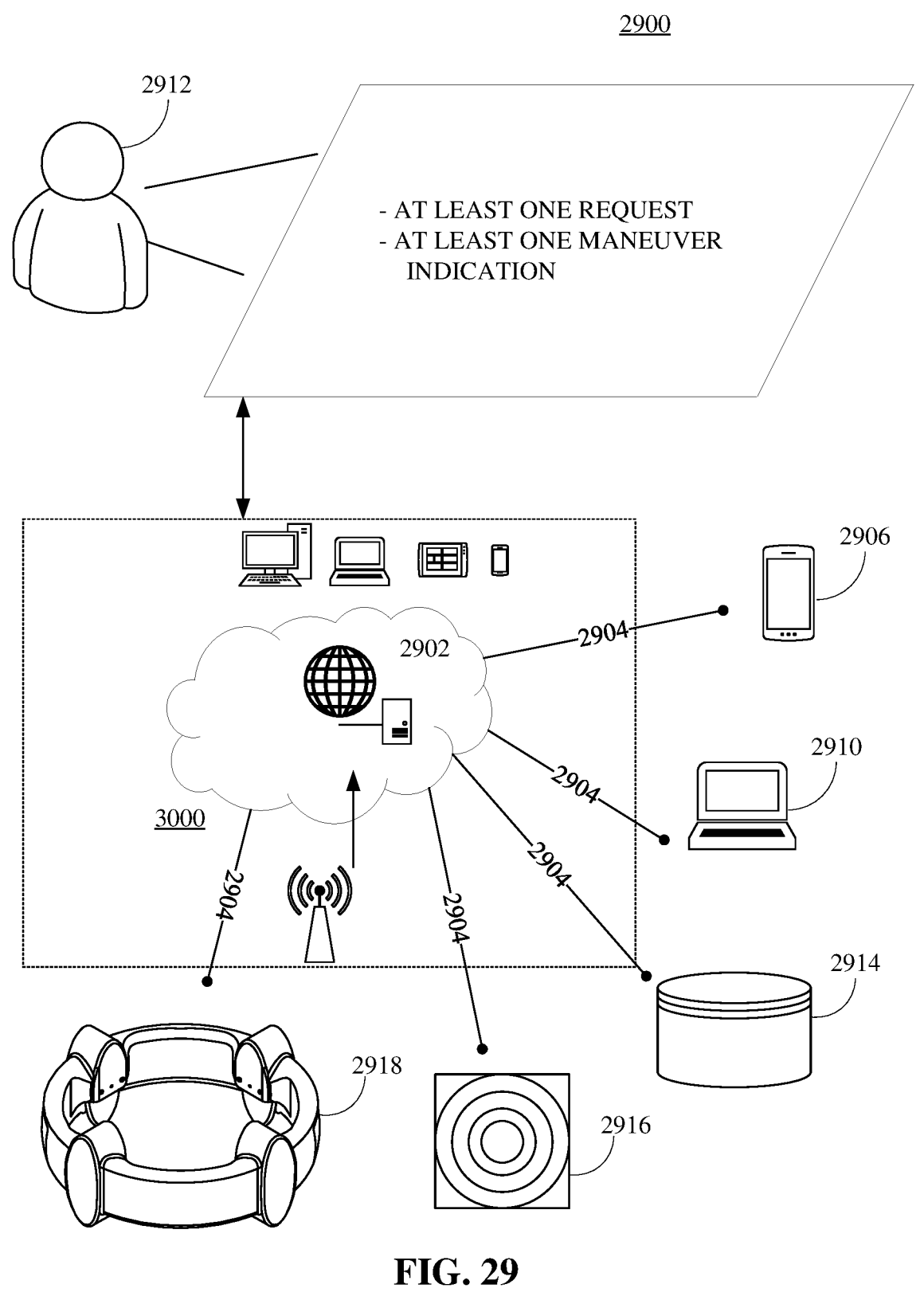

FIG. 29 is an illustration of an online platform 2900 consistent with various embodiments of the present disclosure. By way of non-limiting example, the online platform 2900 to facilitate providing a balance to objects may be hosted on a centralized server 2902, such as, for example, a cloud computing service. The centralized server 2902 may communicate with other network entities, such as, for example, a mobile device 2906 (such as a smartphone, a laptop, a tablet computer etc.), other electronic devices 2910 (such as desktop computers, server computers etc.), databases 2914, sensors 2916, and an apparatus 2918 (such as the apparatus 100, the apparatus 2800, etc.) over a communication network 2904, such as, but not limited to, the Internet. Further, users of the online platform 2900 may include relevant parties such as, but not limited to, end-users, administrators, service providers, service consumers and so on. Accordingly, in some instances, electronic devices operated by the one or more relevant parties may be in communication with the platform.

A user 2912, such as the one or more relevant parties, may access online platform 2900 through a web based software application or browser. The web based software application may be embodied as, for example, but not be limited to, a website, a web application, a desktop application, and a mobile application compatible with a computing device 3000.

Figure 30:
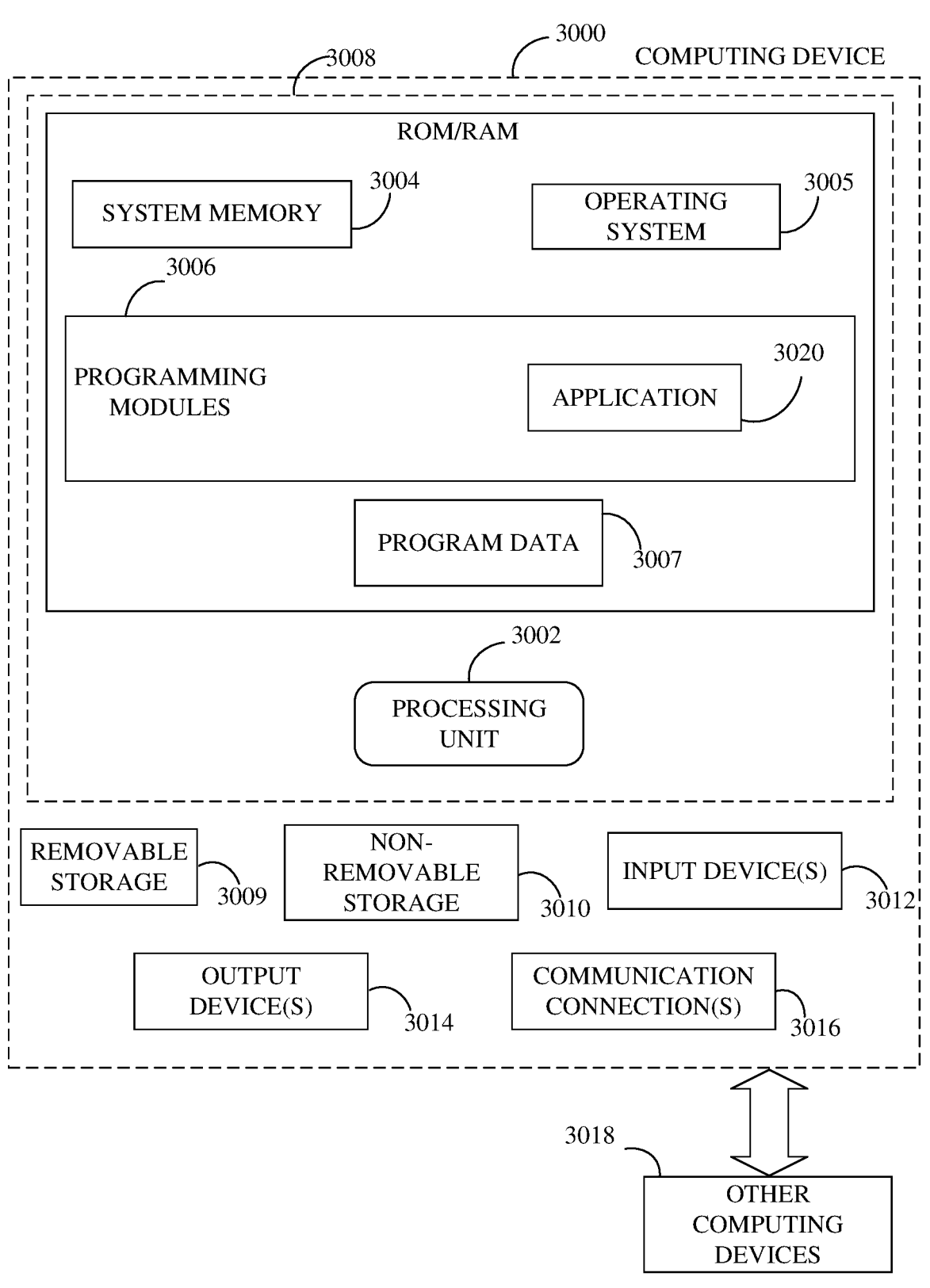
FIG. 30 is a block diagram of a computing device for implementing the methods disclosed herein, in accordance with some embodiments.

With reference to FIG. 30, a system consistent with an embodiment of the disclosure may include a computing device or cloud service, such as computing device 3000. In a basic configuration, computing device 3000 may include at least one processing unit 3002 and a system memory 3004. Depending on the configuration and type of computing device, system memory 3004 may comprise, but is not limited to, volatile (e.g. random-access memory (RAM)), non-volatile (e.g. read-only memory (ROM)), flash memory, or any combination. System memory 3004 may include operating system 3005, one or more programming modules 3006, and may include a program data 3007. Operating system 3005, for example, may be suitable for controlling computing device 3000's operation. In one embodiment, programming modules 3006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 30 by those components within a dashed line 3008.

Computing device 3000 may have additional features or functionality. For example, computing device 3000 may also include additional data storage devices (removable and/or non-removable) such as, for example, magnetic disks, optical disks, or tape. Such additional storage is illustrated in FIG. 30 by a removable storage 3009 and a non-removable storage 3010. Computer storage media may include volatile and non-volatile, removable and non-removable media implemented in any method or technology for storage of information, such as computer-readable instructions, data structures, program modules, or other data. System memory 3004, removable storage 3009, and non-removable storage 3010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3000. Any such computer storage media may be part of device 3000. Computing device 3000 may also have input device(s) 3012 such as a keyboard, a mouse, a pen, a sound input device, a touch input device, a location sensor, a camera, a biometric sensor, etc. Output device(s) 3014 such as a display, speakers, a printer, etc. may also be included. The aforementioned devices are examples and others may be used.

Computing device 3000 may also contain a communication connection 3016 that may allow device 3000 to communicate with other computing devices 3018, such as over a network in a distributed computing environment, for example, an intranet or the Internet. Communication connection 3016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3004, including operating system 3005. While executing on processing unit 3002, programming modules 3006 (e.g., application 3020 such as a media player) may perform processes including, for example, one or more stages of methods, algorithms, systems, applications, servers, databases as described above. The aforementioned process is an example, and processing unit 3002 may perform other processes. Other programming modules that may be used in accordance with embodiments of the present disclosure may include machine learning applications. Further, the machine learning applications execute machine learning models.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for providing balance to an object attached to the apparatus, the apparatus comprising:

an annular body comprising a central cavity about a central axis of the annular body, wherein the annular body is configured for receiving the object in the central cavity for placing the annular body around the object;

a plurality of drive assemblies mounted to the annular body, wherein each of the plurality of drive assemblies comprises a motor, a primary sheave, and two secondary sheaves, wherein, for each of the plurality of drive assemblies, the primary sheave is radially and rotatably disposed on the annular body, a first secondary sheave of the two secondary sheaves is rotatably disposed on a top side of the annular body above the primary sheave, and a second secondary sheave of the two secondary sheaves is rotatably disposed on a bottom side opposite to the top side of the annular body below the primary sheave based on a mounting of each of the plurality of drive assemblies on the annular body, wherein the primary sheave and the two secondary sheaves are coplanar, wherein the motor is mechanically coupled with the primary sheave, wherein the motor is configured for rotating the primary sheave about a sheave axis perpendicular to the central axis in at least one direction with at least one speed;

two hoops comprising a first hoop and a second hoop, wherein the first hoop is coaxially disposed on the top side of the annular body and rotatably supported between a primary groove surface of each primary sheave and a first secondary groove surface of each first secondary sheave, wherein the second hoop is coaxially disposed on the bottom side of the annular body and rotatably supported between the primary groove surface and a second secondary groove surface of each second secondary sheave, wherein rotation of each primary sheave is configured to rotate the first hoop in a first direction with at least one hoop speed about the central axis and the second hoop in a second direction opposite to the first direction with the at least one hoop speed about the central axis for generating balance; and a harness configured for attaching the apparatus to the object after receiving of the object in the central cavity, wherein attaching of the apparatus to the object provides balance to the object in use.

2. The apparatus of claim 1, wherein balance is associated with a balance level corresponding to the at least one hoop speed of the two hoops, wherein the balance level is configured to prevent an instance of a disbalance associated with a disbalance level smaller than the balance level in the object.

3. The apparatus of claim 2 further comprising:

at least one motion sensor configured for generating at least one motion data based on detecting a movement associated with the object;

a processing device communicatively coupled with the at least one motion sensor, wherein the processing device is configured for:

analyzing the at least one motion data;

determining the instance of the disbalance in the object based on analyzing the at least one motion data; and generating a command for the motor of each of the plurality of drive assemblies based on determination of the instance of the disbalance, wherein the motor of each of the plurality of drive assemblies is communicatively coupled with the processing device, wherein rotation of each primary sheave is based on the command.

4. The apparatus of claim 3, wherein determination of the instance of the disbalance comprises determining the disbalance level of the instance of the disbalance in the object based on analyzing the at least one motion data, wherein the processing device is further configured for:

determining the balance level required by the object based on the disbalance level of the instance of the disbalance in the object;

determining one direction of the at least one direction and one speed of the at least one speed for rotation of each primary sheave based on the determination of the balance level, wherein rotation of each primary sheave with the one speed of the at least one speed is configured to rotate the two hoops with one hoop speed of the at least one hoop speed for generation of balance at the balance level, wherein generation of the command is further based on determination of the one direction of the at least one direction and the one speed of the at least one speed, wherein rotation of each primary sheave comprises rotating each primary sheave in the one direction of the at least one direction with the one speed of the at least one speed based on the command.

5. The apparatus of claim 4, wherein analysis of the at least one motion data comprises analyzing the at least one motion data using a first machine learning model, wherein the first machine learning model is trained for detecting instances of disbalance in the object based on movements of the object, wherein determination of the instance of the disbalance comprises predicting the instance of the disbalance happening in a future time in the object based on analysis of the at least one motion data using the first machine learning model, wherein generation of the command is further based on predicting the instance of the disbalance.

6. The apparatus of claim 3, wherein the object comprises a body of a user, wherein the apparatus further comprises at least one biometric sensor communicatively coupled with the processing device, wherein the at least one biometric sensor is configured for generating at least one biometric data based on detecting a physiological state of the user, wherein the processing device is further configured for analyzing the at least one biometric data, wherein determination of the instance of the disbalance in the object is further based on analysis of the at least one biometric data.

7. The apparatus of claim 6, wherein analysis of the at least one biometric data comprises analyzing the at least one biometric data using a second machine learning model, wherein the second machine learning model is trained for detecting instances of disbalance in the object based on physiological states of the user, wherein determination of the instance of the disbalance in the object comprises predicting the instance of the disbalance happening in a future time based on analysis of the at least one biometric data using the second machine learning model, wherein generation of the command is further based on predicting the instance of the disbalance.

8. The apparatus of claim 3 further comprising: at least one environment sensor communicatively coupled with the processing device, wherein the at least one environment sensor is configured for generating at least one environment data based on detecting a presence of an environmental factor in an environment of the object, wherein the processing device is further configured for analyzing the at least one environment data, wherein determination of the instance of the disbalance in the object is further based on analysis of the at least one environment data.

9. The apparatus of claim 8, wherein analysis of the at least one environment data comprises analyzing the at least one environment data using a third machine learning model, wherein the third machine learning model is trained for detecting instances of disbalance in the object based on influences of environmental factors on the object, wherein determination of the instance of the disbalance in the object comprises predicting the instance of the disbalance happening in a future time in the object based on analysis of the at least one environment data using the third machine learning model, wherein generation of the command is further based on predicting the instance of the disbalance.

10. The apparatus of claim 2 further comprising:

a communication device configured for receiving at least one request from at least one user device;

a processing device communicatively coupled with the communication device, wherein the processing device is configured for:

analyzing the at least one request;

determining the balance level required by the object from the apparatus based on analyzing the at least one request;

determining one of the at least one direction and one of the at least one speed for rotation of each primary sheave based on determination of the balance level, wherein rotation of each primary sheave with the one speed of the at least one speed is configured to rotate the two hoops with one hoop speed of the at least one hoop speed for providing balance at the balance level; and generating a command for the motor of each of the plurality of drive assemblies based on determination of the one direction of the at least one direction and the one speed of the at least one speed for rotation of each primary sheave, wherein the motor of each of the plurality of drive assemblies is communicatively coupled with the processing device, wherein rotation of each primary sheave comprises rotating each primary sheave in the one direction of the at least one direction with the one speed of the at least one speed based on the command.

11. The apparatus of claim 2 further comprising:

a communication device configured for receiving at least one maneuver indication of at least one maneuver to be performed by the object;

a storage device communicatively coupled with the communication device, wherein the storage device is configured for retrieving at least one maneuver model associated with the at least one maneuver based on the at least one maneuver indication, wherein the at least one maneuver model provides balance levels required by the object in instances during performance of the at least one maneuver;

at least one sensor configured for generating at least one maneuver data based on detecting at least one maneuvering instance during the at least one maneuver; and a processing device communicatively coupled with the storage device and the at least one sensor, wherein the processing device is configured for:

analyzing the at least one maneuver data using the at least one maneuver model;

determining the balance level required for each of the at least one maneuvering instance during the at least one maneuver based on analysis of the at least one maneuver data;

determining one of the at least one direction and one of the at least one speed for rotation of each primary sheave based on determination of the balance level, wherein rotation of each primary sheave with the one speed of the at least one speed is configured to rotate the two hoops with one hoop speed of the at least one hoop speed for providing balance at the balance level; and generating a command for the motor of each of the plurality of drive assemblies based on determination of the one direction of the at least one direction and the one speed of the at least one speed for rotation of each primary sheave, wherein the motor of each of the plurality of drive assemblies is communicatively coupled with the processing device, wherein rotation of each primary sheave comprises rotating each primary sheave in the one direction of the at least one direction with the one speed of the at least one speed based on the command.

12. The apparatus of claim 11, wherein the storage device is further configured for retrieving at least one historical maneuver data, wherein the at least one historical maneuver data comprises at least one historical maneuvering instance during at least one historical maneuver performed by the object, wherein the processing device is configured for:

analyzing the at least one historical maneuver data;

identifying the instance of the disbalance at the disbalance level produced in the object during performance of the at least one historical maneuver corresponding to the at least one historical maneuvering instance based on analysis of the at least one historical maneuver data;

training at least one untrained machine learning model with the instance of the disbalance at the disbalance level produced in the object during performance of the at least one historical maneuver to predict the balance level required by the object during performance of the at least one maneuver based on identifying the instance of the disbalance; and generating at least one maneuver model based on the training, wherein the storage device is configured for storing the at least one maneuver model.

13. The apparatus of claim 1, wherein the harness is configured for removably attaching the apparatus to the object.

14. An apparatus for providing balance to an object attached to the apparatus, the apparatus comprising:

an annular body comprising a central cavity about a central axis of the annular body, wherein the annular body is configured for receiving the object in the central cavity for placing the annular body around the object;

a plurality of drive assemblies mounted to the annular body, wherein each of the plurality of drive assemblies comprises a motor, a primary sheave, and two secondary sheaves, wherein, for each of the plurality of drive assemblies, the primary sheave is radially and rotatably disposed on the annular body, a first secondary sheave of the two secondary sheaves is rotatably disposed on a top side of the annular body above the primary sheave, and a second secondary sheave of the two secondary sheaves is rotatably disposed on a bottom side opposite to the top side of the annular body below the primary sheave based on a mounting of each of the plurality of drive assemblies on the annular body, wherein the primary sheave and the two secondary sheaves are coplanar, wherein the motor is mechanically coupled with the primary sheave, wherein the motor is configured for rotating the primary sheave about a sheave axis perpendicular to the central axis in at least one direction with at least one speed;

two hoops comprising a first hoop and a second hoop, wherein the first hoop is coaxially disposed on the top side of the annular body and rotatably supported between a primary groove surface of each primary sheave and a first secondary groove surface of each first secondary sheave, wherein the second hoop is coaxially disposed on the bottom side of the annular body and rotatably supported between the primary groove surface and a second secondary groove surface of each second secondary sheave, wherein rotation of each primary sheave is configured to rotate the first hoop in a first direction with at least one hoop speed about the central axis and the second hoop in a second direction opposite to the first direction with the at least one hoop speed about the central axis for generating balance;

a harness configured for attaching the apparatus to the object after receiving of the object in the central cavity, wherein attaching of the apparatus to the object provides balance to the object in use, wherein balance is associated with a balance level corresponding to the at least one hoop speed of the two hoops, wherein the balance level is configured to prevent an instance of a disbalance associated with a disbalance level smaller than the balance level in the object;

at least one motion sensor configured for generating at least one motion data based on detecting a movement associated with the object; and a processing device communicatively coupled with the at least one motion sensor, wherein the processing device is configured for:

analyzing the at least one motion data;

determining the instance of the disbalance in the object based on analyzing the at least one motion data; and generating a command for the motor of each of the plurality of drive assemblies based on determination of the instance of the disbalance, wherein the motor of each of the plurality of drive assemblies is communicatively coupled with the processing device, wherein rotation of each primary sheave is based on the command.

15. The apparatus of claim 14, wherein determination of the instance of the disbalance comprises determining the disbalance level of the instance of the disbalance in the object based on analyzing the at least one motion data, wherein the processing device is further configured for:

determining the balance level required by the object based on the disbalance level of the instance of the disbalance in the object;

determining one of the at least one direction and one of the at least one speed for rotation of each primary sheave based on determination of the balance level, wherein rotation of each primary sheave with the one speed of the at least one speed is configured to rotate the two hoops with one speed of the at least one hoop speed for generation of balance at the balance level, wherein generation of the command is further based on determination of the one direction of the at least one direction and the one speed of the at least one speed, wherein rotation of each primary sheave comprises rotating each primary sheave in the one direction of the at least one direction with the one speed of the at least one speed based on the command.

16. The apparatus of claim 15, wherein analysis of the at least one motion data comprises analyzing the at least one motion data using a first machine learning model, wherein the first machine learning model is trained for detecting instances of disbalance in the object based on movements of the object, wherein determination of the instance of the disbalance comprises predicting the instance of the disbalance happening in a future time in the object based on analysis of the at least one motion data using the first machine learning model, wherein generation of the command is further based on predicting the instance of the disbalance.

17. The apparatus of claim 14, wherein the object comprises a body of a user, wherein the apparatus further comprises at least one biometric sensor communicatively coupled with the processing device, wherein the at least one biometric sensor is configured for generating at least one biometric data based on detecting a physiological state of the user, wherein the processing device is further configured for analyzing the at least one biometric data, wherein determination of the instance of the disbalance in the object is further based on analysis of the at least one biometric data.

18. The apparatus of claim 17, wherein analysis of the at least one biometric data comprises analyzing the at least one biometric data using a second machine learning model, wherein the second machine learning model is trained for detecting instances of disbalance in the object based on physiological states of the user, wherein determination of the instance of the disbalance in the object comprises predicting the instance of the disbalance happening in a future time based on analysis of the at least one biometric data using the second machine learning model, wherein generation of the command is further based on predicting the instance of the disbalance.

19. The apparatus of claim 14 further comprising: at least one environment sensor communicatively coupled with the processing device, wherein the at least one environment sensor is configured for generating at least one environment data based on detecting a presence of an environmental factor in an environment of the object, wherein the processing device is further configured for analyzing the at least one environment data, wherein determination of the instance of the disbalance in the object is further based on analysis of the at least one environment data.

20. The apparatus of claim 19, wherein analysis of the at least one environment data comprises analyzing the at least one environment data using a third machine learning model, wherein the third machine learning model is trained for detecting instances of disbalance in the object based on influences of environmental factors on the object, wherein determination of the instance of the disbalance in the object comprises predicting the instance of the disbalance happening in a future time in the object based on analysis of the at least one environment data using the third machine learning model, wherein generation of the command is further based on predicting the instance of the disbalance.

\* \* \* \* \*